United States Patent [19]
Fukuoka et al.

[11] Patent Number: 5,692,186
[45] Date of Patent: Nov. 25, 1997

[54] PRODUCTION SYSTEM, HIERARCHICAL NETWORK AND METHOD OF NODE CONTROL OF HIERARCHICAL NETWORK

[75] Inventors: Toshiyuki Fukuoka; Satoshi Hikida, both of Kawasaki, Japan

[73] Assignee: Fujitsu Limited, Kawasaki, Japan

[21] Appl. No.: 374,111

[22] Filed: Jan. 18, 1995

[30] Foreign Application Priority Data

Jan. 20, 1994 [JP] Japan ..................... 6-004513
Jan. 20, 1994 [JP] Japan ..................... 6-004514

[51] Int. Cl.$^6$ ................................. G06F 17/30
[52] U.S. Cl. ................... 395/617; 395/610; 395/614
[58] Field of Search .................. 395/660, 617, 395/610, 614, 611

[56] References Cited

U.S. PATENT DOCUMENTS 4,866,635  9/1989  Kahn et al. ..................... 364/513
5,210,868  5/1993  Shimada et al. ................. 375/600
5,528,516  6/1996  Yemini et al. ................... 364/555.01
5,559,693  9/1996  Anick et al. .................... 364/419.08

*Primary Examiner*—Thomas G. Black
*Assistant Examiner*—Cheryl Lewis
*Attorney, Agent, or Firm*—Staas & Halsey

[57] ABSTRACT

A production system including a network processing unit which allows a node, which refers to a data part which has changed, to execute a necessary change such that nodes in a data base are always kept in a latest state, and a production processing unit which selects and matches only a production rule, which refers to the node which has changed, so as to shorten the time required for the matching processing. A method of node control designates the direct node which is not necessary to be processed, when there is a change in the data part of a hierarchical network, so as to perform the processing in the network efficiently.

19 Claims, 26 Drawing Sheets

NETWORK
PROCESSING

PRODUCTION
PROCESSING

PRODUCTION SYSTEM, HIERARCHICAL NETWORK AND METHOD OF NODE CONTROL OF HIERARCHICAL NETWORK

BACKGROUND OF THE INVENTION

1. Field of the Invention

The present invention relates to a production system which operates at real time, a hierarchical network and a method of controlling a node processing operation in the hierarchical network.

2. Description of Related Art

A production system which utilizes techniques for decision making or solving problems is used in various fields as an interface for man-machine dialog and as brains for replacing a man.

As the field of utilization becomes wider, complicated problems requiring a deep knowledge must be processed at high-speed. For example, in the case of utilization in an automatic drive control of an automobile, based on road, traffic and many other conditions, an optimum route to a destination must be decided, and at the same time, a real time response against imminent event variations such as braking suddenly when discovering an unexpected obstacle, is necessary.

FIG. 1 is a block diagram showing a configuration of a conventional production system.

In the figure, a production system 80 includes a rule base 81 consisting of a set of a plurality of production rules in the form of IF (condition part)—THEN (acting part), a data base (work area) 82 which is a variable or data description of a real world status or events, and an inference control unit 83 for updating data in the data base 82 by applying the rules.

The inference control unit 83 matches the condition part of the production rules and data of the data base 82 to make out the production rule satisfying the condition part as a conflict rule (91), selects one production rule from the conflict rule based on a given reference to resolve the conflict (92), executes the execution part of the production rule (93). The inference is accomplished by repeating these processings (refer to Japanese Patent Application Laid Open No. 1-239642(1989)).

However, in the above-mentioned conventional production system 80, when there is a change in data in the data base 82, in order to obtain the result responsive to the new status after the charge, the whole production rules in the rule base 81 were subjected to the matching processing.

Thus, since the time necessary for matching processing becomes longer as an amount of production rules or data increases, a cycle of matching processing, conflict resolution and execution becomes longer, and for example, when the conventional production system 80 is incorporated in a system for proceeding the processing by dialog, it was difficult to respond at real time to the change in external status.

Also, in recent years, as a neural network technology develops, a system for executing various processings by using a network structure is in use. In such a system, though the number of nodes increases as the processing contents become more complicated, since the high-speed processing is required at the same time, it is necessary to enhance the processing efficiency of an entire system.

A method of node control in a conventional hierarchical network is described with reference to FIG. 2 showing a configuration of the nodes of the usual hierarchical network.

In FIG. 2, the nodes ND included in the hierarchical network 30 are modules MD constituted by program parts and data parts controlled by the program parts, thereby, a hierarchical network having interdependence between the hierarchies is constituted. The interdependence means the relationship shown by arrows in the figure, wherein data from a lower layer node is required for processing in an upper layer module. The module MD processes the data sent from the lower layer by the program part, thereby the content of data part is updated and the processed data is sent to the upper layer module MD.

For example, the module MD of the node ND2 processes data for temperature variations according to the data sent from the node ND4 and node ND5, and sends the result to the node ND1. In the node ND1, according to information related to the temperature variations sent from the Node ND2 and information related to the speed sent from the Node ND3, processing for deciding the operation is executed. By the processing result of the node ND1, for example, the operation of a robot or an automatic machinery is controlled, or a picture displayed on a screen of a display unit is controlled.

At this time, when the information related to the temperature variations is not necessary, but only the information related to the speed of the node ND3 is necessary in the deciding operation of the Node ND1, the data processing in a the node ND2 and the data processing in the node ND4 connected only to the node ND2 are not necessary.

However, when processing the certain node ND, though it is simple to designate the direct node ND which is not necessary for the processing, it is very difficult to designate the node ND, whose data processing is not necessary, among a number of nodes ND connected to the designated direct node ND by a network. Thus, conventionally, the data processing is executed also for the node ND whose processing is not necessary, always consuming many hours for processing in the network 30.

In order to solve this problem, for example, it is considered to register the nodes ND, which are not necessary for the required processing, for every case beforehand, and in accordance with the registered state, the activating or non-activating instruction is given to the nodes ND.

However, when employing such means, it is necessary to register the necessary or unnecessary nodes ND for all possible cases beforehand, which is not only troublesome but also flexibility against changes in the structure of the network 30 is spoiled. Also, in order to control the network 30 delicately, the number of nodes ND to be registered increases and a large capacity of memory is needed for its storage, which results in a high system cost.

SUMMARY OF THE INVENTION

The present invention has been devised to solve the problems as mentioned above and, therefore, it is an object thereof to provide a production system capable of shortening the time required for matching processing of production rules in the aforesaid rule base and responding at real time.

The production system of the present invention comprises a data base having a plurality of modules in a network structure, a rule base having a plurality of production rules respectively including a condition part and an executing part, and an inference control unit, the module including a data part and a program part which controls the data part by its action, and the inference control unit including a network processing unit that allows one module, which refers to another module whose data part has changed, to execute the program part of one module, and a production processing unit for executing the production rule which refers to the module whose data part has changed.

The production system of the present invention is characterized in that the network processing unit includes a module selecting unit which selects the modules sequentially from the data base, a reference data judging unit which judges whether the data part of the module to which the selected module refers has changed or not, and a program executing unit which executes the program part of the selected module which refers to the data part when the reference judging unit judges the change.

Furthermore, the production system of the present invention is characterized in that the production processing unit includes a rule selecting unit which selects the production rules which refer to the module whose data part has changed, a matching unit which matches respective condition parts included in the selected production rules with the data parts included in the modules of the data base, and takes out the production rules satisfying the condition parts as conflict rules, a conflict resolution unit which selects a production rule from the conflict rules, and a rule executing unit which executes the selected production rule.

Thus, since whether it has changed or not is judged only for the data part of the module to which the program part of the selected module refers, all other modules are not necessary to be judged, and thus the processing time of the production system is shortened. Also, since only the production rule which refers to the module which has changed is matched, the time required for matching processing and conflict resolution processing is shortened.

The production system of the present invention is constituted such that the network processing unit and the production processing unit are executed as the independent processes, the network processing unit operates at a constant cycle and the production processing unit operates while the network processing unit is not operating.

Thus, the network processing unit responds immediately to the change in external conditions, and the production processing unit performs a complicated inference accurately based on a deep thought.

Meanwhile, the production system of the present invention is characterized in that the data base includes a module having a program part which refers to an output of a sensor detecting conditions of external environment. Thus, it responds at real time to the conditions of external environment for appropriate processing.

It is another object of the present invention to provide a hierarchical network capable of processing data at highspeed in a network, by finding a direct node in which the data processing is not necessary when the data has been changed, and a method of node control of the hierarchical network.

The hierarchical network and the method of node control in the hierarchical network of the present invention include a plurality of nodes having a data part, a node management unit for managing the nodes, first memories for storing status variables of the nodes, and second memories for saving the status variables respectively, wherein by the node management unit, the status variable value of the first memory instructed to change the operating state and the status variable value of the second memory of the node are switched with one another, a value based on the change in status variable of the first memory of the node is transferred to the node which is interdependent with the node, the node receiving the transfer adds the transferred value to the status variable value of its own node, and transfers the transferred value to the node which is interdependent with itself, and judges whether or not the status variable values of the nodes included in the hierarchical network exceed a constant reference value to decide the operating state of the respective nodes in accordance with the judged result.

Also, the hierarchical network and the method of node control in the hierarchical network of the present invention includes the plurality of nodes, the first memories and the second memories, wherein by the node management unit managing the nodes, the status variable value of the first memory of the node instructed to change the operating state and the status variable value of the second memory of the node are switched with one another. When the instruction is for activating the operating state, the changed status variable value of the first memory of the node receiving the sequence control is transferred to the node which is interdependent with the node, and when the instruction is for non-activating the operating state, an inverted code of the changed status variable value of the first memory of the node receiving the instruction is transferred to the node. The node receiving the transfer adds the transferred value to the status variable value of its own node, transfers the transferred value to the node which is interdependent with itself, and judges whether or not the status variable values of the nodes included in the hierarchical network exceed a constant reference value to decide the operating state of the nodes in accordance with the judged result.

Thus, when the change in operating state is instructed, since the contents of the first and second memories of the node which has been instructed are switched with one another, and the status variable value is transferred to the node which is interdependent with the node, the direct node which is not necessary to be processed due to the change is found to shorten the processing time of the network.

The method of node control of the hierarchical network of the present invention is characterized in that when the destination node receives the non-activation instruction, the node destination stops to transfer to the other nodes. Thus, even in the network including the blocking state, the operating state of the nodes is controlled accurately.

Still further, the method of node control in the hierarchical network of the present invention is characterized in that plural sets of first memories and second memories are provided respectively in the nodes, and by switching these memories, the operating state of the nodes is decided for a plurality of operation purposes. Thus, the appropriate control is effected in accordance with the purpose of use of the network and situation being controlled.

The above and further objects and features of the invention will more fully be apparent from the following detailed description with accompanying drawings.

DESCRIPTION OF THE PREFERRED EMBODIMENTS

In the following, the present invention is particularly described based on the drawings showing its embodiments.

Figure 3:
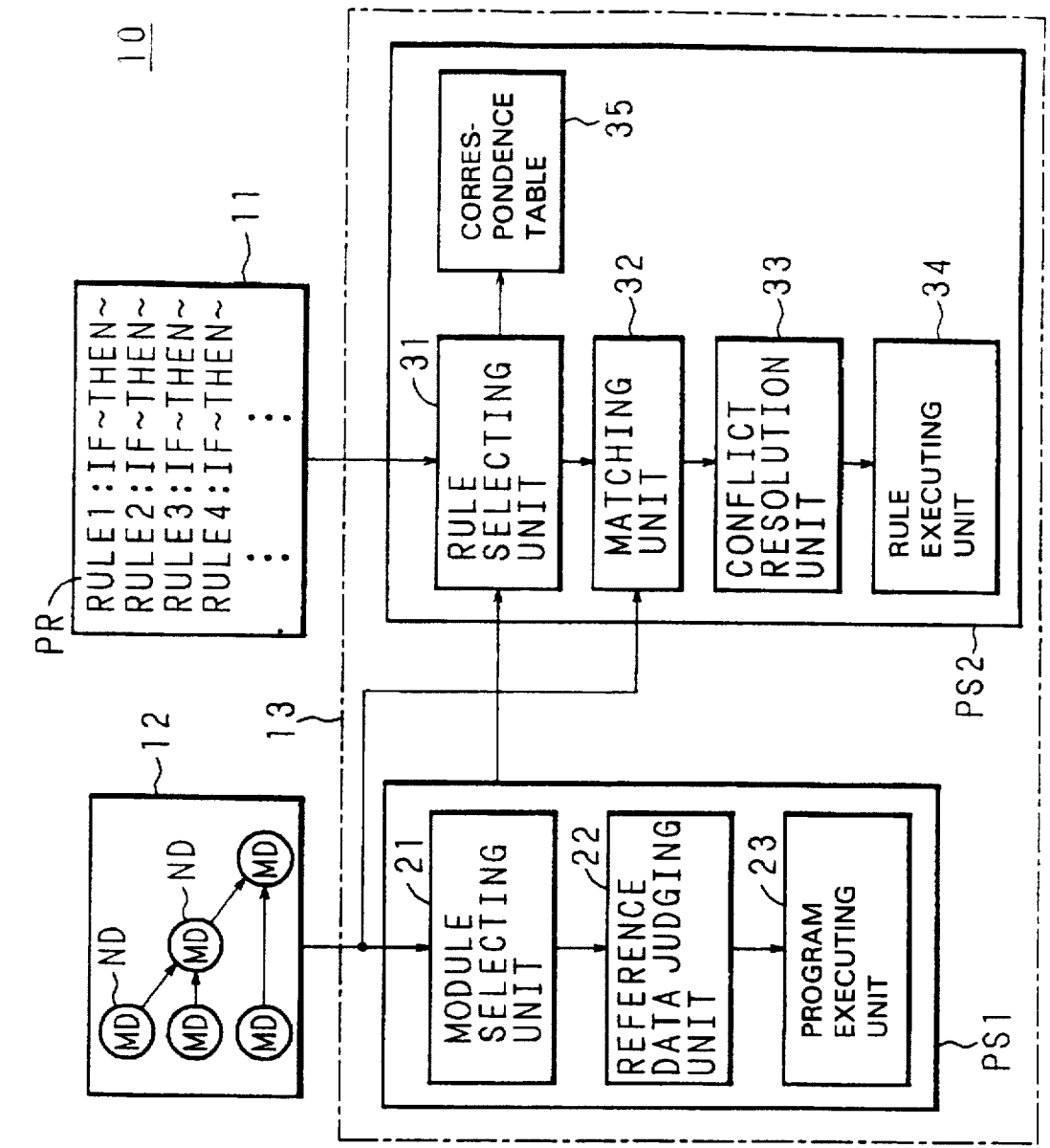
FIG. 3 is a block diagram showing a configuration of a production system of the present invention.

FIG. 3 is a block diagram showing a configuration of a production system 10 according to the present invention.

The production system 10 comprises a rule base 11, a data base 12 and an inference control unit 13.

The rule base 11 is comprises of a set of a plurality of production rules PR in the form of IF (condition part)—THEN (executing part).

The data base 12 includes a number of modules MD having events in variable or data description, the modules MD are in a network structure as nodes ND.

The inference control unit 13 makes inferences against data in the data base 12 by applying the production rules PR, and updates the data or outputs its solution.

Figure 4:
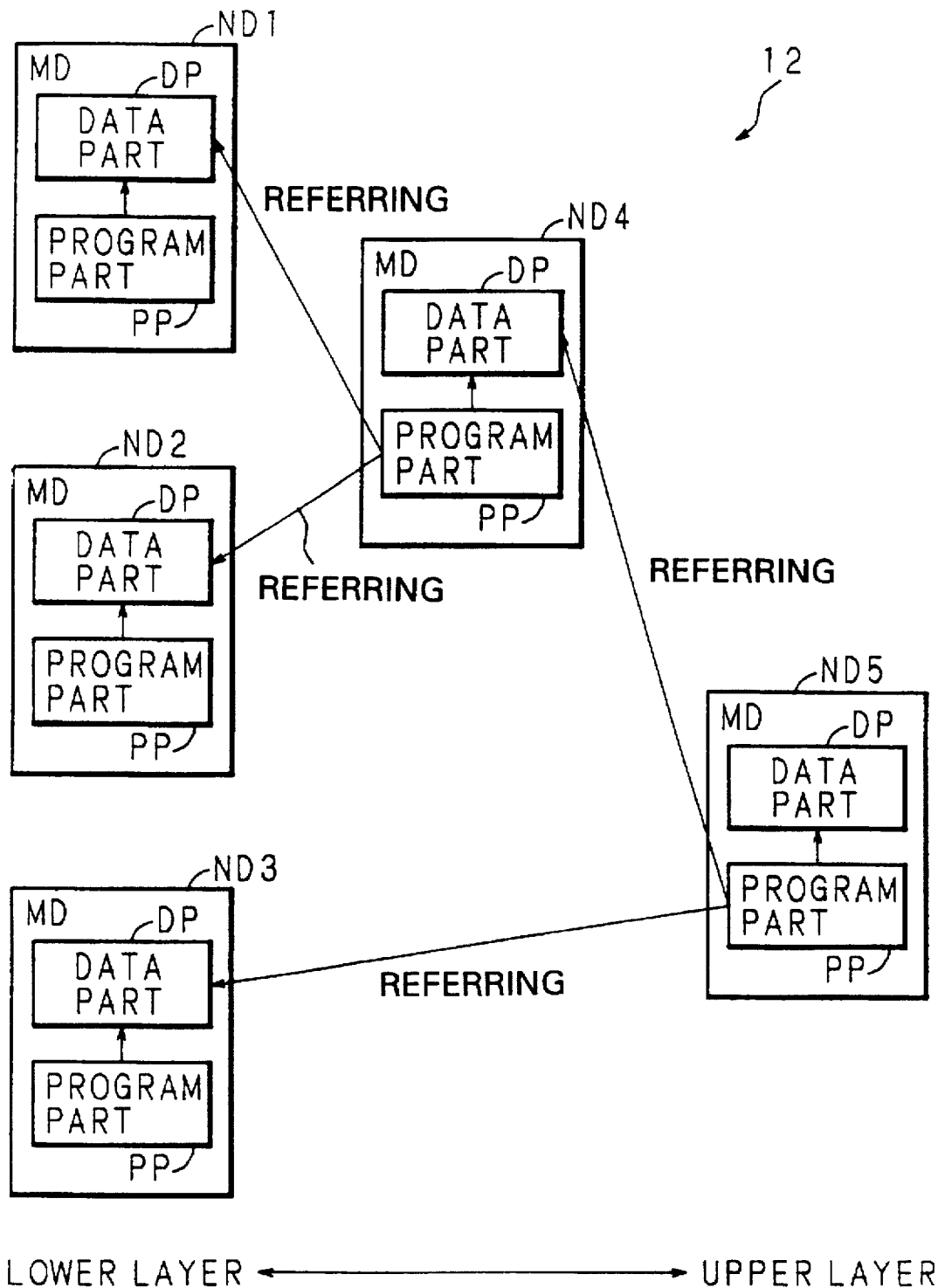
FIG. 4 is a view showing an example of a data base structure according to the present invention.
Figure 5:
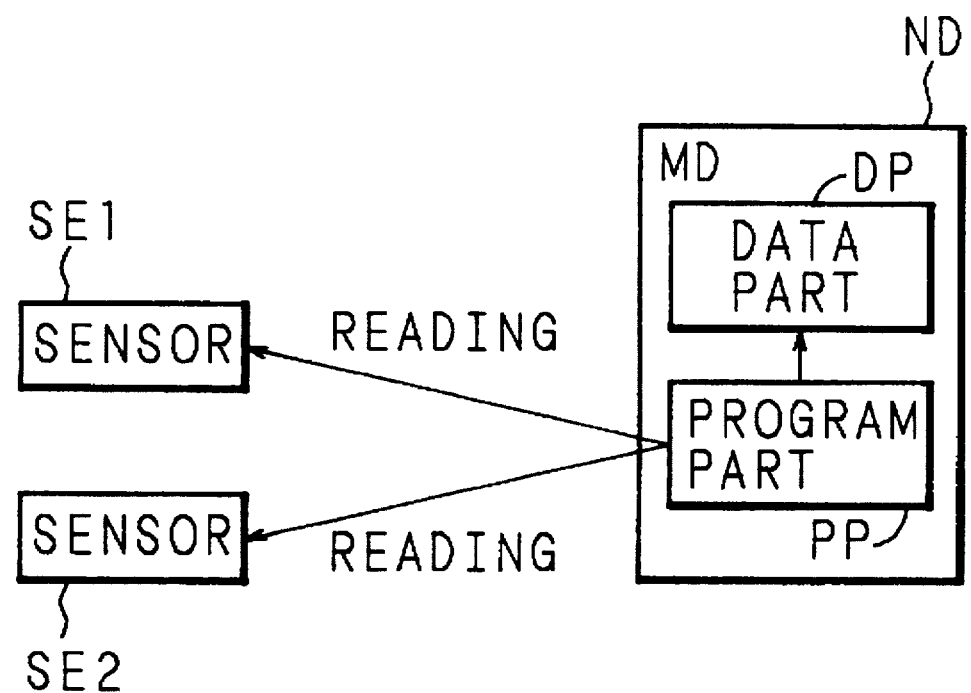
FIG. 5 is a view showing a configuration of a lowermost layer node according to the present invention.

FIG. 4 is a view showing an example of a data base structure, FIG. 5 is a view showing a configuration of a lowermost node ND, Table 1 is a table showing an example of processing content in a program part PP and Table 2 is a table showing an example of the production rules PR 1 to 3.

TABLE 1

| loudness of voice | shrillness of voice | degree of self-confidence |
|---|---|---|
| 1 | 1 | 1 |
| 1 | 2 | |
| 2 | 1 | |
| 1 | 3 | 2 |
| 2 | 2 | |
| 3 | 1 | |
| 2 | 3 | 3 |
| 3 | 2 | |
| 3 | 3 | |

TABLE 2

| | IF | THEN |
|---|---|---|
| PR1 | no self-confidence but answer is correct | with self-confidence!! |
| PR2 | no self-confidence and answer is incorrect | Hold out more!! |
| PR3 | self-confidence and answer is correct | That's the way!! |

In FIG. 4, the modules MD comprise of the program part PP and the data part DP controlled by the program part PP. The modules MD are in a network structure, wherein the module MD which refers to the respective data parts DP is its upper layer node ND, and the module MD which refers to the respective program parts PP is its lower layer node ND.

As shown in FIG. 5, for example, sensors SE1, SE2 detecting an external status and a condition of external environment are inputted and connected to the lowermost layer node ND. The program part PP of the node ND reads outputs of the sensors SE1, SE2, and stores a measured value, status value, flag and so on corresponding to the content in the data part DP. As the sensor SE, for example, a temperature sensor, a speed sensor, a voice sensor (microphone), an image sensor (camera) and the like are used, and thereby the external status for the real time processing is observed.

Usually, since the external status is changing ever 7 moment, the output of the sensor SE is also changing constantly. The program part PP suitably processes the variable outputs of the sensor SE, and the same in the data part DP as handy data.

For example, when the sensor SE is the temperature sensor detecting a room temperature, variables indicating temperature ranks divided into several steps are stored in the data part DP. When the sensor SE is the microphone detecting the loudness of human voice, variables 1 to 3 indicating the loudness (large, medium, small) are stored in the data part DP. Thus, even when the output of the sensor SE changes, the content of the data part DP is not necessarily changed responsive thereto.

Also, though the node ND 4 shown in FIG. 4 refers to the data parts DP of the node ND1 and node ND2, the data part DP of the node ND4 does not change always even when the data parts DP of the node ND1, ND2 have changed.

For example, assuming that the variables 1 to 3 indicating the rank of voice loudness are stored in the data part DP of the node ND1, the variables 1 to 3 indicating the rank of voice shrillness are stored in the data part DP of the node ND2, and the program part PP of the node ND4 which refers to the data parts DP judges the degree of self-confidence from the voice loudness and shrillness to store the variables 1 to 3 indicating the ranks in the data part DP.

In Table 1, the processing content of the program part PP of such node ND4 is shown, and in accordance with the voice loudness and shrillness, the variables 1 to 3 are stored in the data part DP. At this time, for example, when both the voice loudness and shrillness are "1" and thus the degree of self-confidence is "1", even when the voice data is inputted next and its shrillness changes to "2", the degree of self-confidence remains at "1".

The node ND4 in this case is a further abstraction of the semantic content of the node ND1 and node ND2. That is, the data of further abstraction is stored in the upper layer node ND in such a manner that, abstraction data is produced from concrete data based on data inputted from the sensors SE1, SE2 to further produce the abstraction data therefrom.

By producing the abstraction module MD in such a manner, the following advantages are obtained. That is, firstly, when the content of the data parts DP of the nodes ND is included in the condition part, the content of one upper layer node ND having the nodes ND as the lower layer can be described in the condition part, thus description of the condition part of the production rule PR is simplified. For example, in Table 2, in the production rule PR1, though it is described simply "no self-confidence" in the condition part, when there is no node ND4, it is necessary to describe "loudness of voice is small and its shrillness is low or medium, or loudness of voice is medium and its shrillness is low", resulting in a complicated description.

Secondly, since the data part DP of further abstraction is hardly changed, and the production rule PR, in which the data part DP of its node ND is included in the condition part, a matching frequency is reduced and the processing speed is improved as a whole.

For example, even when the voice loudness and shrillness change within the range shown in the ranks in Table 1, since the degree of self-confidence is not changed, the production rule PR including the content of the data part DP of the node ND4 in the condition part is not necessary to be executed on in this case. Thus, the frequency of matching processing can be reduced, by matching the production rule PR including the content of the data part DP in the condition part only when there is a change in the data part DP. On the contrary, when there is no node ND4, the production rule PR as mentioned above must be matched whenever the voice loudness or shrillness changes, resulting in frequent matching and a long processing time.

In FIG. 3, the inference control unit 13 includes a network processing unit PS1 for executing the program part PP of the node ND which refers to the node ND whose data part DP has changed, and a production processing unit PS2 for executing the production rule PR which refers to the node ND whose data part DP has changed. The network processing unit PS1 and the production processing unit PS2 are respectively allocated as the different processes, and perform processings independently.

Figure 6:
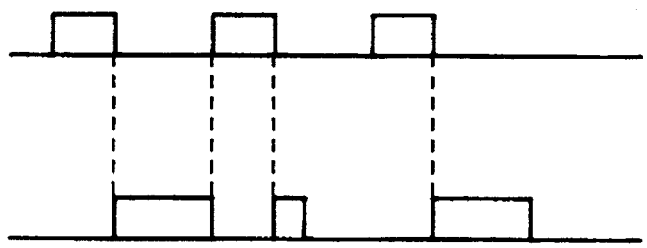
FIG. 6 is a timing chart of a network processing unit and a production processing unit according to the present invention.

FIG. 6 is a timing chart of the operation of the network processing unit and the production processing unit, and as shown in FIG. 6, the network processing unit PS1 operates at a constant cycle, and the production processing unit PS2 operates while the network processing unit PS1 is not operating. The network processing unit PS1 sometimes operates as being divided into several parts.

The network processing unit PS1 includes a module selecting unit 21, a reference data judging unit 22 and a program executing unit 23.

The module selecting unit 21 selects the nodes ND (modules MD1 one by one from the lowermost layer from the data base 12 for extraction. The reference data judging unit 22 judges whether there is a change or not in the data part DP of the module MD to which the program part PP of the selected node ND refers. The program executing unit 23, when there is the change in the data part DP, executes the program part PP of the module MD which refers thereto, and when necessary, updates the content of the data part DP. The nodes ND in the data base 12 are always kept in a latest state by the network processing unit PS1.

The production processing unit PS2 includes a rule selecting unit 31, a matching unit 32, a conflict resolution unit 33, a rule executing unit 34 and a correspondence table 35.

The rule selecting unit 31 refers to the correspondence table 35 and selects the production rule PR which refers to the node ND whose data part DP has changed. The correspondence table 35 shows a corresponding relationship between the production rules PR and the nodes ND having the data parts DP referred by the condition part of the production rule PR. The matching unit 32 matches the condition part of the selected production rule PR and the data part DP of the nodes ND, and takes out the production rule PR satisfying the condition part as a conflict rule. The conflict resolution unit 33 selects an optimum production rule PR from the conflict rule according to a given reference. The rule executing unit 34 executes the executing part of the selected production rule PR.

Next, the content of inference control by the inference control unit 13 is described with reference to a flow chart.

Figure 7:
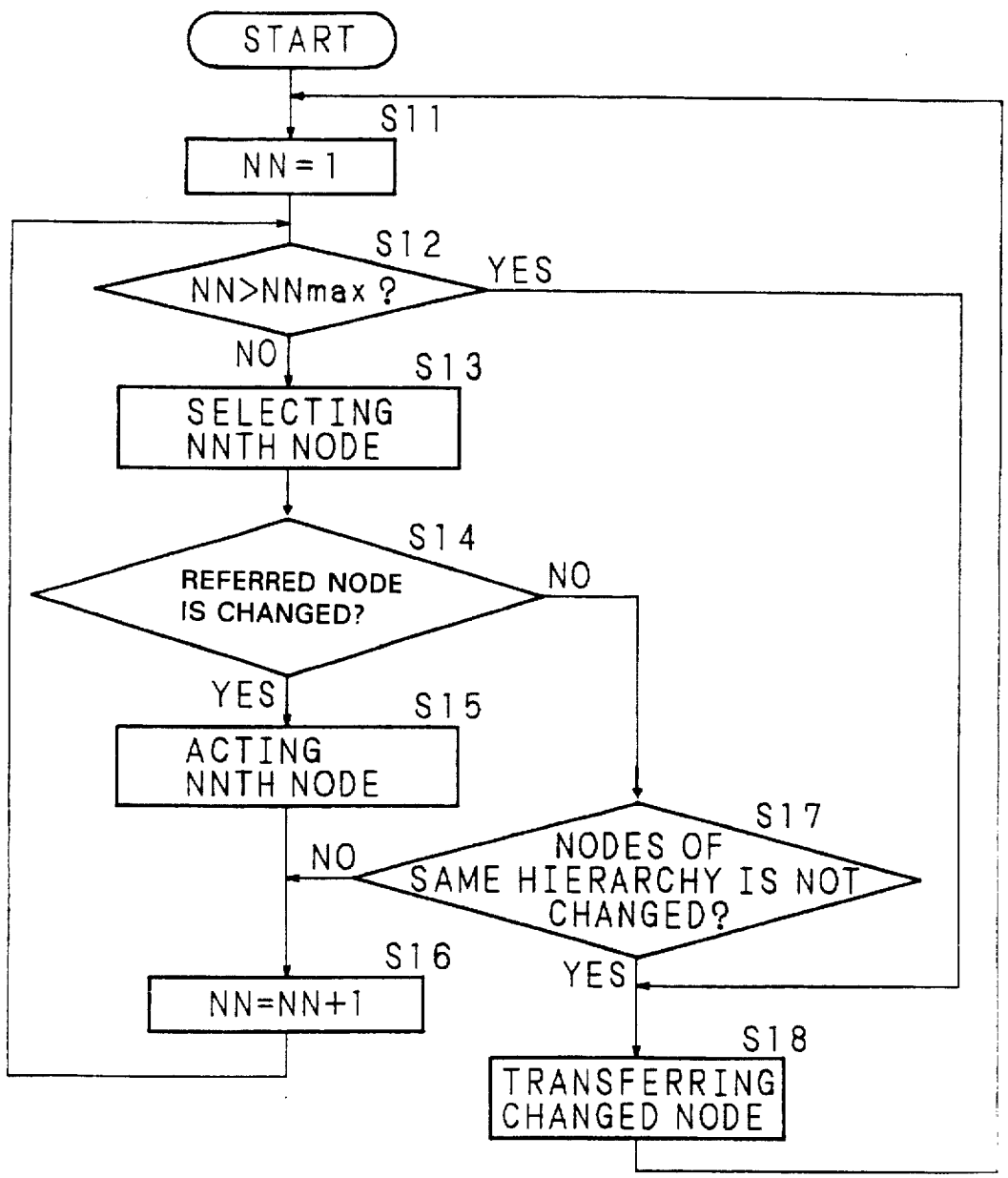
FIG. 7 is a flow chart showing the processing operation by a network processing unit according to the present invention.
Figure 8:
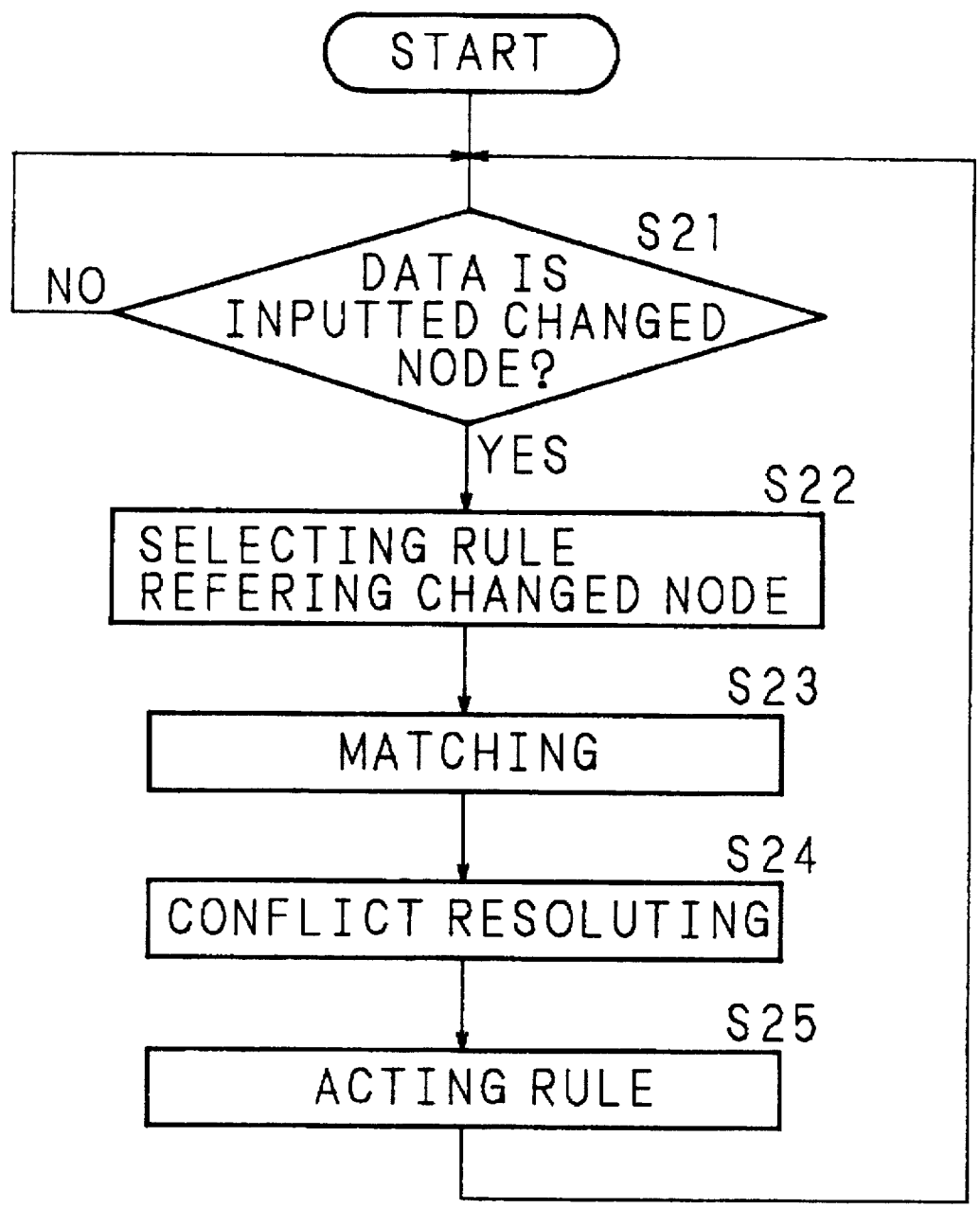
FIG. 8 is a flow chart showing the processing operation by a production processing unit according to the present invention.

FIG. 7 is a flow chart showing the processing operation by the network processing unit PS1, and FIG. 8 is a flow chart showing the processing operation by the production processing unit PS2.

In FIG. 7, first, NN indicating the number of the node ND is set to an initial value "1" (Step S11), and the node number NN is compared with a maximum value NNmax (Step S12), and when the node number NN is below the maximum value NNmax, the NNth node ND is selected (Step S13). When above the maximum value NNmax, the node ND which has changed is transferred to the production processing unit PS2 (Step S18). The node number NN is numbered sequentially from the lower layer.

Whether the data part DP of the module MD to which the program part PP of the selected node ND refers is changed or not is judged (Step S14), and when there is the change, the program part PP of the node ND is executed (Step S15) and 1 is added to the node number NN, and then the processing returns to Step S12.

When there is no change in Step S14, whether there is any change in the data part DP of all the nodes ND of the same hierarchy or not is judged (Step S17). When there is the change, the processing proceeds to Step S16 without acting the NNth node ND. When there is no change, since it is sure that there is no change in the node ND of the higher hierarchy, the program part PP is not necessary to be executed for the nodes ND thereafter. Thus, if yes in the step S17, the node ND which has changed is transferred to the production processing unit PS2 (Step S18), and the processing returns to Step S11 to process from the first node ND.

By such processing of the network processing unit PS1, the necessary change for the data part DP is acted for the node ND which refers to the data part DP which has changed, and the nodes ND in the data base 12 are always kept in a latest state.

In FIG. 8, it is judged whether the data is inputted or not for the node ND which has changed (Step S21), when inputted (step S21), the production rule PR which refers to the node ND is selected (Step S22), and the condition part of the selected production rule PR is matched with the data part DP of the nodes ND (Step S23) to resolute the conflict (Step S24), then the executing part of the one selected production rule PR is executed (Step S25).

As such, since the production processing unit PS2 selects only the production rule PR which refers to the node ND which has changed for matching, the time required for matching processing and conflict resolution processing is considerably shortened, and thus the processing speed is improved as a whole. Also, since the processing by the production processing unit PS2 is executed only when the data part DP of the node ND has changed, the processing time of the production processing unit PS2 is reduced. Particularly, in the data base 12, since the abstraction data is produced by referring to the concrete data and the node ND storing the data is provided, the number of nodes ND to which the production rule PR refers is reduced, the probability of change in the referred node ND is low, the operation time of the production processing unit PS2 is short, and the total processing speed of the production system 10 is improved. Thus, in the production system 10, the inference based on the complicated processing or a deep knowledge is possible for that amount.

An outline of the operation of the network processing unit PS1 and the production processing unit PS2 is described in the following, collectively.

In the network processing unit PS1, the nodes ND are selected one by one sequentially from the lower layer, and it is judged whether the data part DP of the module MD referred to by the program part PP of the selected node ND has changed or not. When it has changed, the program part PP of the node ND is executed. When it has not changed, the next node ND is selected without executing the program part PP of the node ND. By such processing of the network processing unit PS1, for the node which refers to the data part DP which has changed, the necessary change is executed and the nodes ND in the data base 12 are always kept in the latest state. The node ND which has changed is transferred to the production processing unit PS2.

In the production processing unit PS2, when the data is inputted for the node ND which has changed, the production Pule PR which refers to the node ND is selected, the condition part of the selected production rule PR is matched with the data part DP of the nodes ND for resoluting the conflict, and the executing part of the one selected production rule PR is executed. In the production processing unit PS2, by selecting and matching only the production rule PR which refers to the node ND which has changed, the time required for the matching processing is shortened.

Figure 9:
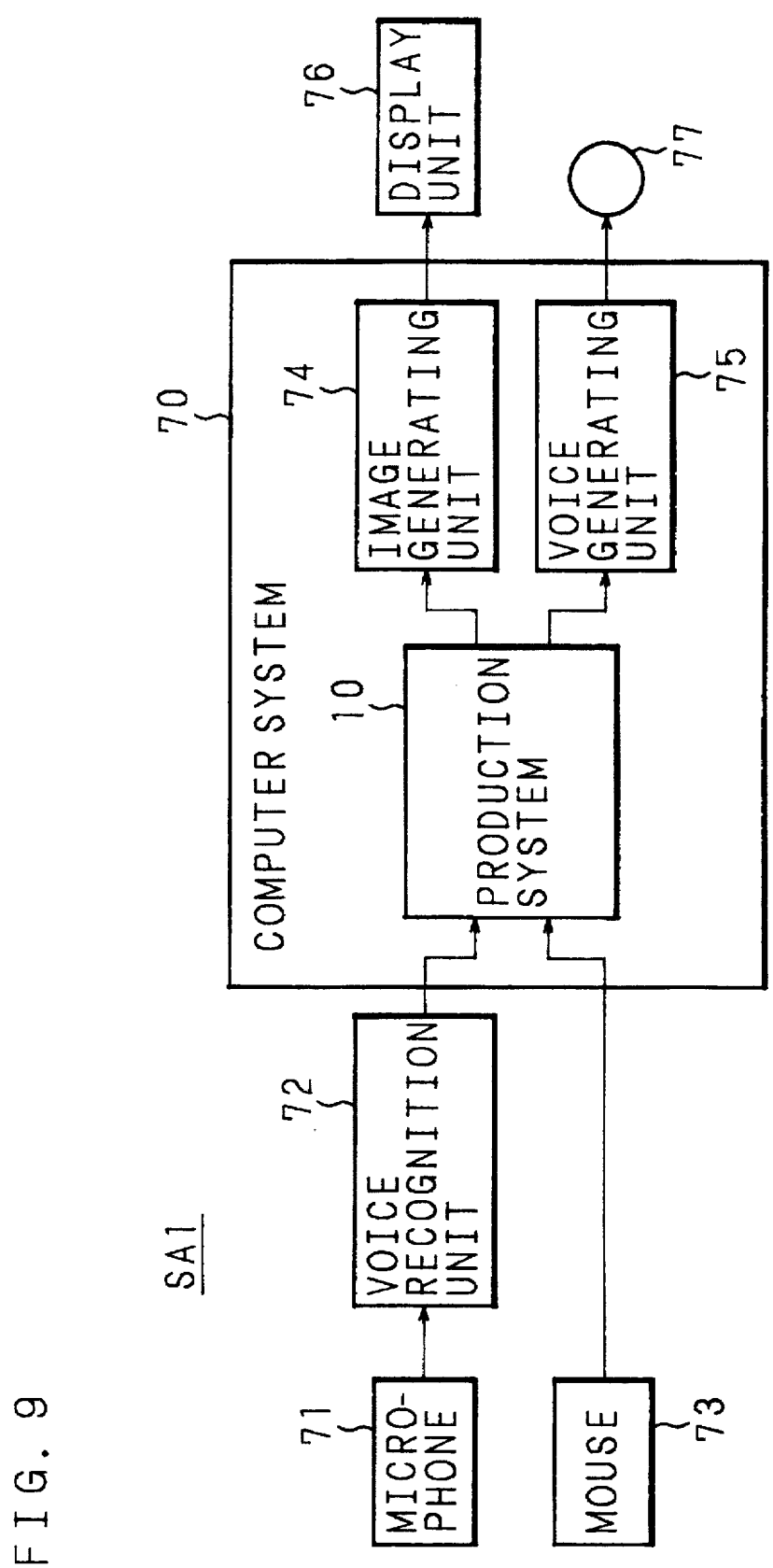
FIG. 9 is a block diagram of an example of a system utilizing a production system of the present invention.

FIG. 9 is a block diagram showing an example of an education system SA1 for children utilizing the production system 10 as described above.

The education system SA1 comprises the production system 10 incorporated in a computer system 70 such as a work station or a personal computer, wherein the children's voice picked up by a microphone 71 is analyzed by a voice recognition unit 72 and inputted to the production system 10. Also, by operating a mouse 73 upon watching a screen of a display unit 76, inputs and/or instructions are given to the production system 10 or the computer system 70. The production system 10 operates at real time responding to the loudness, shrillness and content of children's voice and the input content by the mouse 73, and produces an image necessary at that time by an image generating unit 74 to display on the screen of the display unit 76, or generates a voice by a voice generating unit 75 to output from a speaker 77.

That is, the display unit 76 and the speaker 77 serve as a teacher for the children, and responding immediately to the voice and action of the children, displays the effective image and outputs suitable languages. For example, when the children speak to a character displayed on the screen of the display unit 76, responding to the voice, the character on the screen gets angry or smiles. Thereby, the children are informed whether or not their voice or action was suitable.

In the production system 10 of the present embodiment, changes in the external status are always processed suitably by the network processing unit PS1, and a high-speed processing is possible by the production processing unit PS2, so that the children's voice or action can be responded to immediately. Also, by the processing operation of the network processing unit PS1, it is possible to display the image, whereby the character notices the children's speech and looks back as the immediate solution. Since the network processing unit PS1 monitors the input from the microphone 71 and the like at a constant cycle while generating such images, even when there is a different input, it can be responded to immediately. Also, the production processing unit PS2 makes a more complicated inference to obtain the solution in parallel, and thus an accurate answer based on a deep thought can be outputted even after some time has elapsed.

By the way, in the conventional production system having a slow processing speed, since the input is not accepted during the inference and the image and voice are in a quiescent state, the children's voice can not be responded to immediately.

Figure 10:
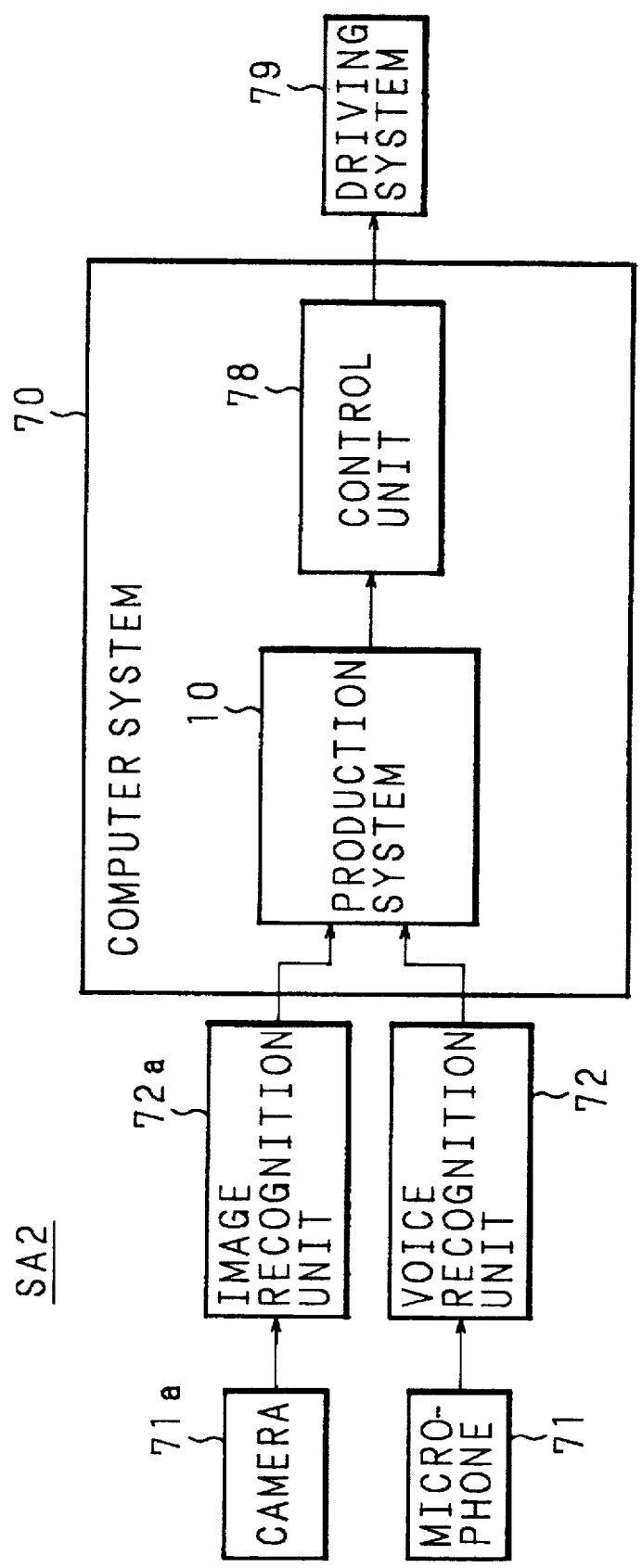
FIG. 10 is a block diagram of an example of a system utilizing a production system of the present invention.

FIG. 10 is a block diagram showing an example of an automatic drive system SA2 of an automobile utilizing the above-mentioned production system 10.

The automatic drive system SA2 observes conditions of external environment by a camera 71a and a microphone 71, and analyzes by an image recognition unit 72a and a voice recognition unit 72 to input to the production system 10, which calculates an optimum operation of a driving system 79. When any obstacle is discovered in the front and it is not an urgent matter, a most suitable route to avoid it is calculated by the production processing unit PS2, but when it is a sudden obstacle to avoid urgently, the network processing unit PS1 applies braking immediately.

As such, according to the production system 10 of the present embodiment, in an interactive real time system, when a real time solution is to be calculated, the processing is executed by the network processing unit PS1 till the production processing unit PS2 calculates the solution, and when a complicated processing requiring a long processing time is to be executed, it is possible to process, based on a deep knowledge, by the production processing unit PS2. Thus, it is possible to incorporate the production system 10 in a real time system, which is expected to be in frequent use in the future, for deep thought according to the circumstances.

In the above-mentioned embodiment, though the case where the network processing unit PS1 and the production processing unit PS2 are made entirely different by multi-tasking and the like is described, these processings may be executed by the same process. In such case, for example, in the flow chart of FIG. 7, after transferring the node ND which has changed in Step S18 to the production processing unit PS2, the processing may proceed to Step S21 in a flow chart of FIG. 8 without returning to Step S11, and then return to Step S11 after processing in Step S25. Besides, the content, configuration, structure, processing content or sequences and operation timing of the rule base 11, data base 12 and inference control unit 13, and the entire configuration of the production system 10 may be changed diversely without departing from the meaning of the present invention.

According to the present invention, the production system capable of shortening the time required for matching processing and responding at real time can be provided.

Particularly, by producing abstraction data with reference to concrete data and storing the data in the module MD in the upper layer node, the number of nodes to which the production rules PR refers is decreased and the probability of change in the node being referred to is reduced, and thus the operation time of the production processing unit PS2 is on the short end and the processing speed of the production system 10 becomes faster as a whole. When any emergency arises, it is also possible to obtain the most preferential solution by only the network processing unit PS1.

Furthermore, by matching only the production rule PR which refers to the module MD which has changed, the time required for matching processing and conflict resolution processing is shortened and the total processing speed is increased.

Still further, the network processing unit PS1 is able to respond immediately to the change in external status, and a more complicated inference can be performed by the production processing unit PS2, and thus an accurate solution based on a deep thought can be obtained even after some time has elapsed.

Furthermore, it is possible to respond at real time to the change in conditions of external environment and to output an appropriate solution.

Figure 11:
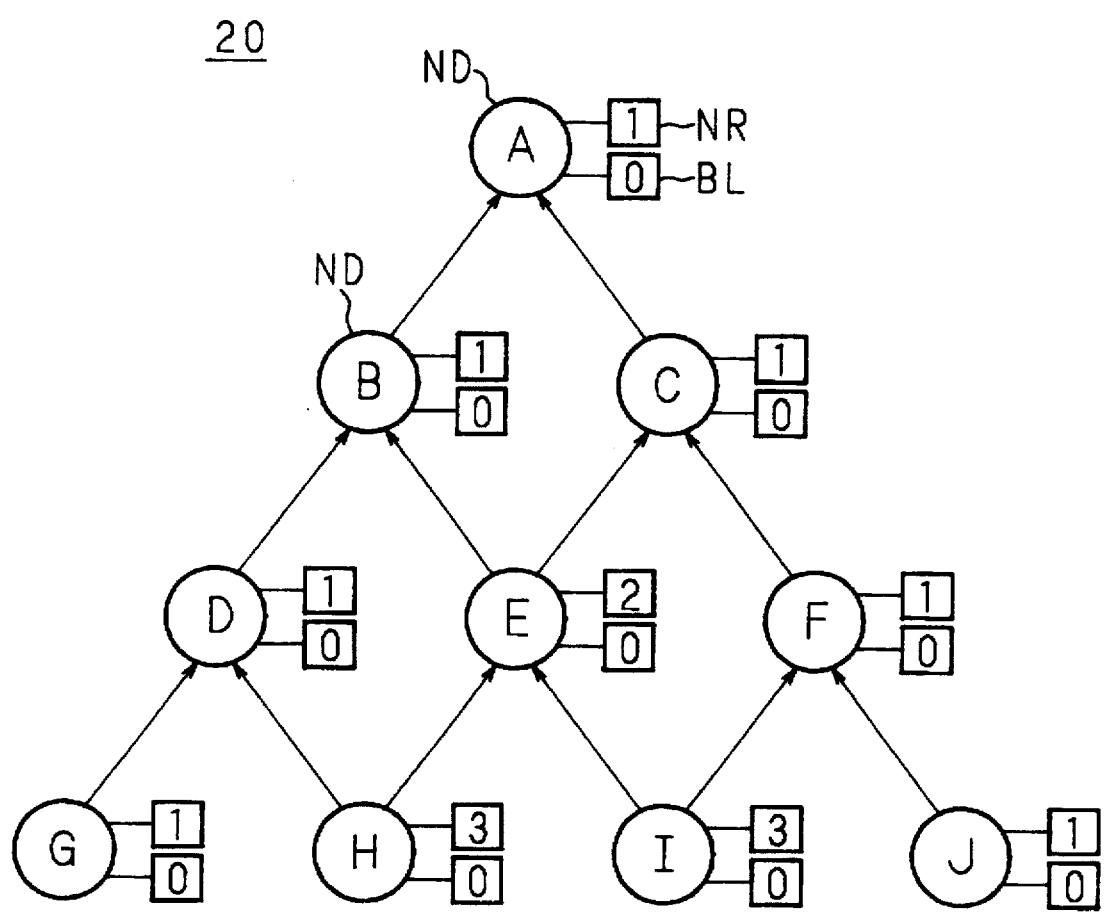
FIG. 11 is a view showing a configuration of a network for carrying out a method of the present invention.
Figure 12:
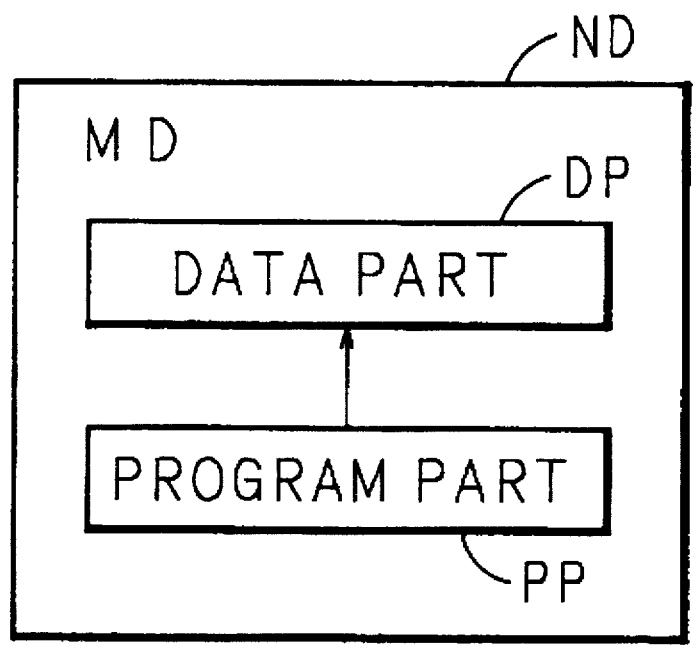
FIG. 12 is a view showing a configuration of nodes in a network of FIG. 11.

FIG. 11 is a view showing an example of a hierarchical network used in a method of the present invention, FIG. 12 is a view showing a configuration of nodes ND in a network 20, and Table 3 shows an example of a configuration of a node management table TNM. In the figures, "node A", "node B", "node ND1" designate the specific individual nodes, and "node ND" designates either of the nodes or a general node.

TABLE 3

| Node ND | Program Pointer PTP | Data Pointer PTD | Mode 1 | | Mode 2 | |
|---|---|---|---|---|---|---|
| | | | Normal NR | Blocking BL | Normal NR | Blocking BL |
| A | QX22q0 | QX60e8 | 1 | 0 | 1 | 0 |
| B | QX22c4 | QX70e8 | 1 | 0 | 0 | 1 |
| C | QX22f8 | QX80e8 | 1 | 0 | 1 | 0 |
| . | . | . | . | . | . | . |
| . | . | . | . | . | . | . |
| . | . | . | . | . | . | . |

In FIG. 11, the network 20 is constituted in a hierarchical network having an interdependence between the hierarchies in such a manner that, the node A is at the top, the lower layer nodes B, C are connected directly to the node A, and the nodes D, E, F are connected to the nodes B, C.

The interdependence means that data from the lower layer nodes are required for processing in the upper nodes, which are indicated by arrows in the figure.

In the nodes ND, a normal memory NR for storing respective status variables VS and a blocking memory BL for saving the status variables VS are provided. Though the memories NR, BL are provided in the node management table TNM for managing the nodes ND, for the purpose of clarifying the states of the nodes ND, they are shown in the form of belonging to the nodes ND.

In FIG. 12, the nodes ND are the modules MD constituted by a program part PP and a data part DP controlled by the program part PP. The modules MD refer to the data part DP of the module MD which is in interdependent relationship with the module MD and process the data sent from the module being referred to, by the program part PP, and thereby the content of the data part DP is updated and the processed data is sent to the upper layer module MD.

In Table 3, in the node management table TNM, for each node ND, a program pointer PTP indicating a leading address of the program part PP, a data pointer PTD indicating a leading address of the data part DP, the normal memory NR and the blocking memory BL in the nodes 1 and 2 are provided. The status variables VS stored in the memories NR, BL indicate how many other nodes are requiring the nodes ND, and decide whether to make the nodes ND active or non-active. That is, when the status variables VS are stored in the normal memory NR and their values are not "0", it is active. When the status variables VS are not stored in the normal memory NR and their values are "0", it is non-active.

Also, for the node which has been instructed to change the operating state, the contents of the normal memory NR and the blocking memory BL of the node ND are replaced with one another, and hence, the status variables VS are stored in the blocking memory BL. When the status variables VS are stored in the blocking memory BL, the node ND is said to be in a blocking state.

Next, the network 20 shown in FIG. 11 is described as to various cases, where activation and non-activation of the node ND are instructed, with reference to the drawings.

First, in FIG. 11, "1" and "0" are respectively set in the normal memory NR and the blocking memory BL of which is A which is at the top, and "1" which is the content of the normal memory NR is transferred to the direct lower layer nodes. In the transferred nodes B and C, the value is added to the respective normal memories NR, and the transferred value is transferred to the direct lower layer nodes of the nodes B and C.

As a result, "1" is stored in the normal memories NR in the nodes D, F, but since "1" is transferred respectively from the nodes B, C in the node E, their sum "2" is stored. Similarly, "1", "3", "3", "1" are respectively stored in the normal memories NR of the nodes G, H, I, J.

Since the values other than "0" are stored in the normal memories NR of the entire nodes ND in the network 1 in the state shown in FIG. 11, all of the nodes ND are active.

Figure 13A:
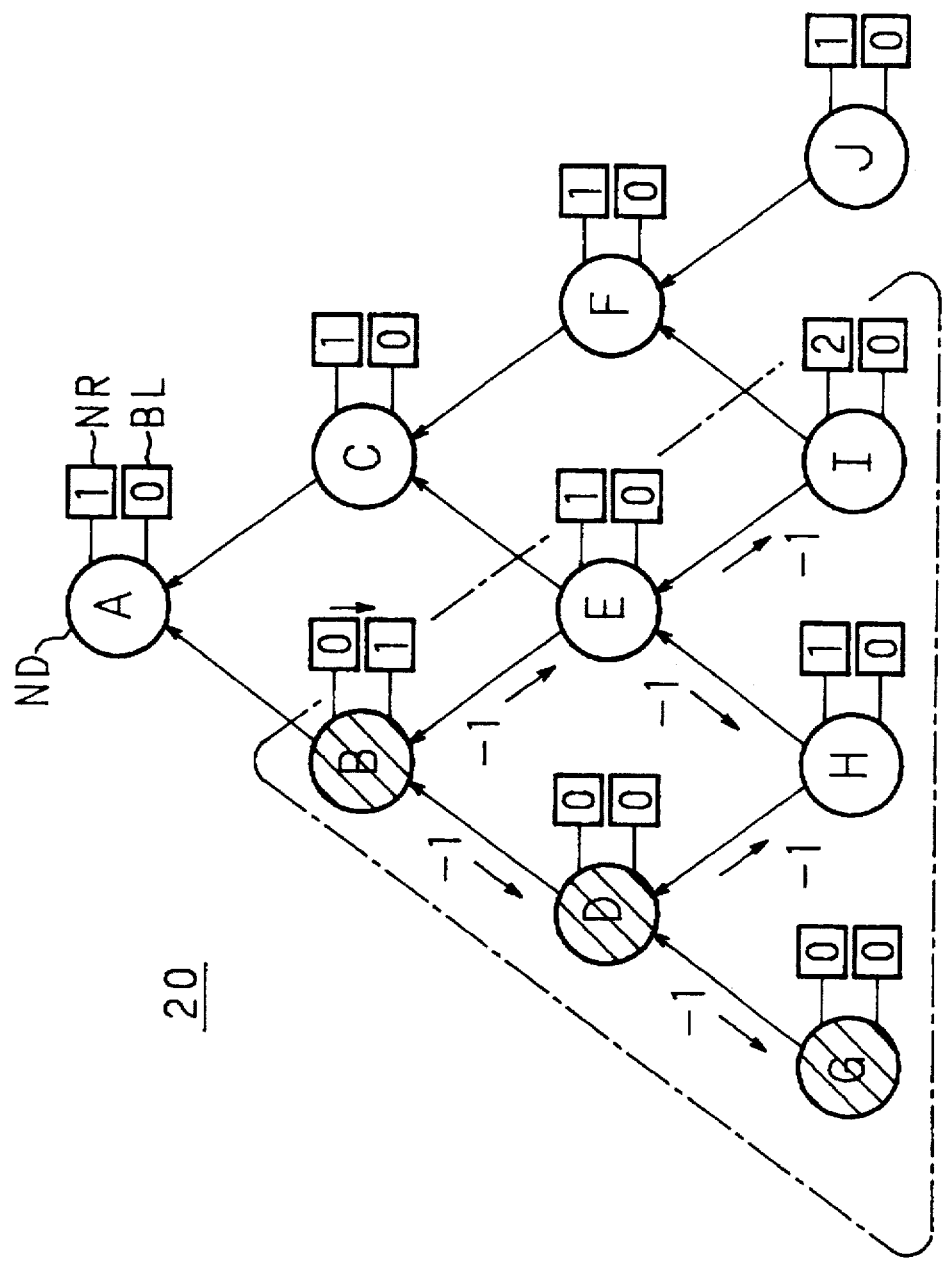
FIG. 13A is a view showing a non-activated state of a node B of FIG. 11.
Figure 13B:
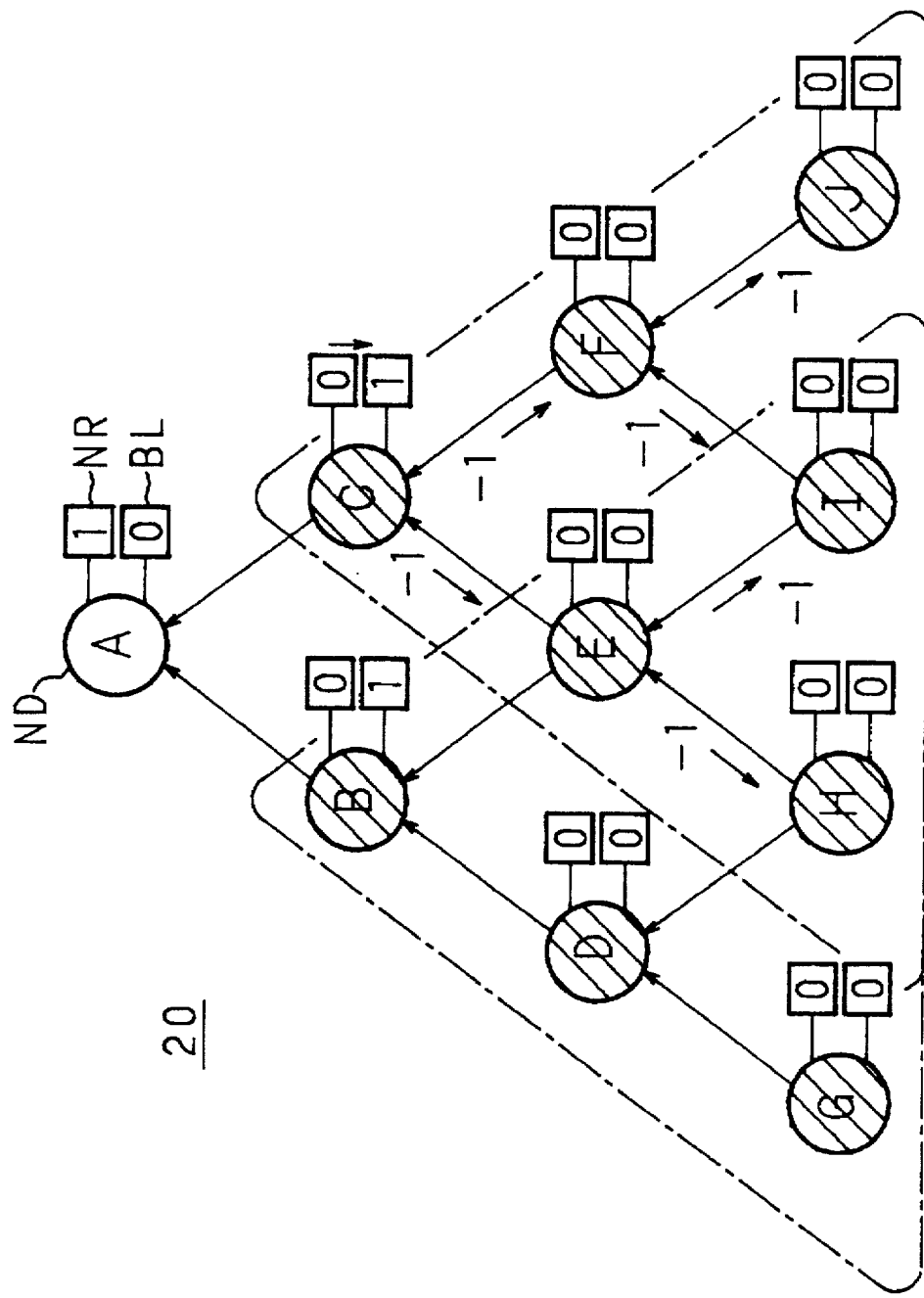
FIG. 13B is a view showing a non-activated state of a node C of FIG. 13A.
Figure 13C:
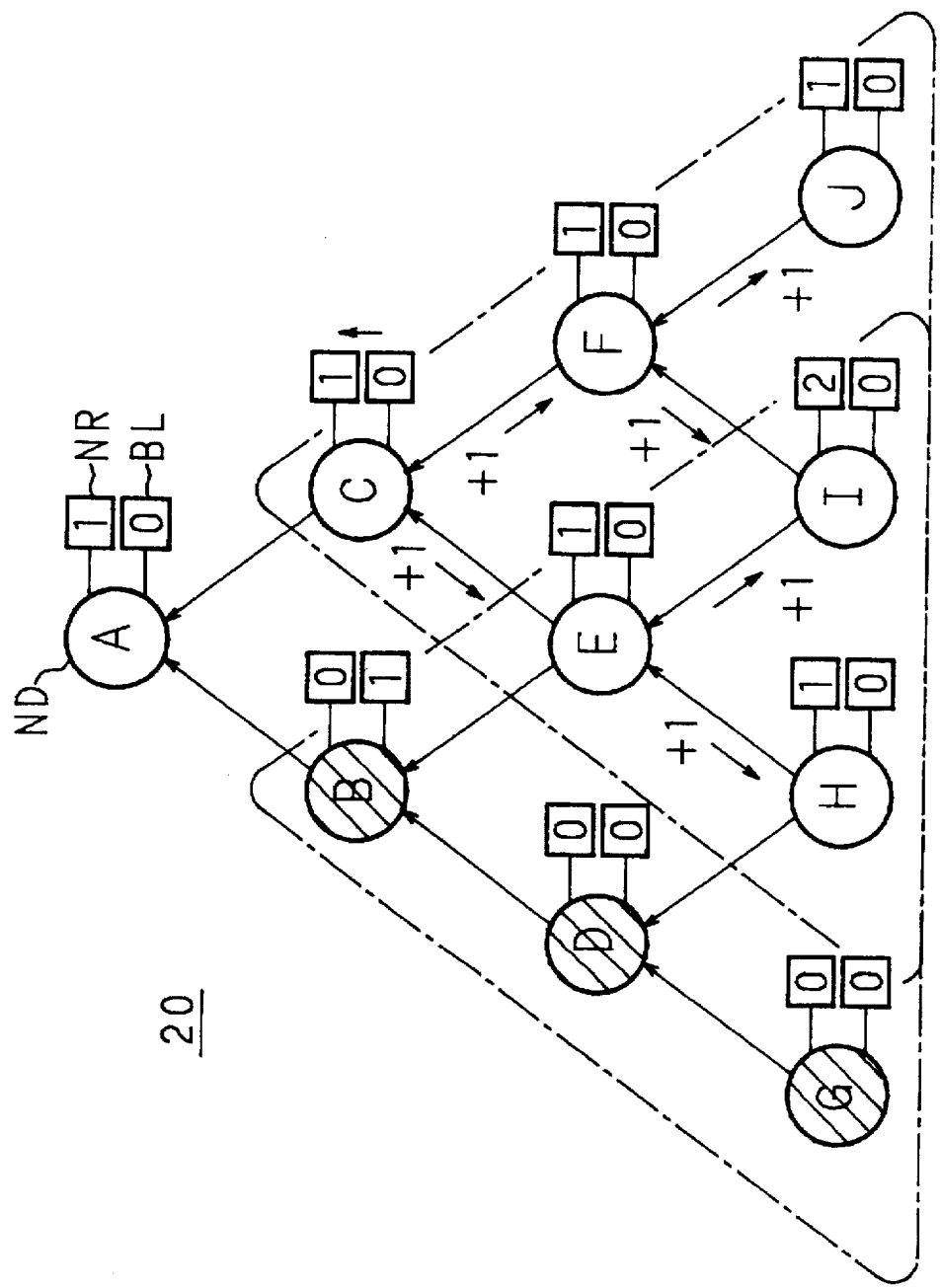
FIG. 13C is a view showing an activated state of a node C of FIG. 13B.

FIG. 13A shows the state where node B is non-activated from the state shown in FIG. 11, FIG. 13B shows the non-activated state of the node C and FIG. 13C shows the state where the node C is activated.

When the non-activation instruction is given to the node B from the node A, as shown in FIG. 13A, in the node B which has been instructed directly, the contents of the normal memory NR and blocking memory BL of the node B are replaced with one another, and "−1", which is a value changed from a code of the status variable VS of the node B, is transferred to the lower layer nodes D, E.

In the nodes D, E receiving the transfer from the node B, the transferred value "−1" is added to the value "1" of the status variable VS stored in the normal memories NR of the nodes D, E. Thereby, all status variables VS become "0". Also, the transferred value "−1" is transferred to the lower layer nodes G, H, I.

In the nodes G, H, I receiving the transfer, similarly, "−1" is added to the respective normal memories NR, which respectively become "0", "1", "2".

As a result, the normal memories NR of the nodes B, D, G become "0", and thus the nodes B, D, G, are in the non-active state. That is, by giving the non-activation instruction to the node B, the nodes B, D, G which are not necessary to be processed become non-active, so that the high-speed processing is performed in the network 1 and a processing efficiency is improved. Since the node B has received the non-activation instruction directly and the status variables VS are stored in the blocking memory BL, it is in the non-activated state as well as the blocking state.

When the non-activation instruction is given next to the node C from the node A in the state shown in FIG. 13A, as shown in FIG. 13B, the processing as same as mentioned above is performed in the node C which has received the instruction directly and in the nodes E, F transferred from the node C. As a result, all of the nodes except the node A become non-active.

When the activation instruction is given next to the node C from the node A in the state shown in FIG. 13B, as shown in FIG. 13C, in the node C which has received the instruction directly, the contents of the normal memory NR and the blocking memory BL of the node C are replaced one another, and the value "1" of the status variable VS of the node C is transferred to the lower layer nodes E, F.

In the nodes E, F receiving the transfer from the node C, the transferred value "1" is added respectively to the value "0" of the status variables VS stored in the normal memories NR of the nodes E, F. Thereby, all of the status variables VS become "1". Also, the transferred value "1" is transferred to the lower layer nodes H, I, J.

In the nodes H, I, J receiving the transfer, similarly, "1" is added to the respective normal memories NR, which respectively become "1", "2", "1". As a result, the node C and the other nodes connected thereto become active and return to the state shown in FIG. 13A.

FIGS. 14A, 14B, 14C and 14D are views showing the state where the node B is non-activated, the node E is non-activated, the node B is activated and the node E is activated sequentially from the state shown in FIG. 11.

Figure 14A:
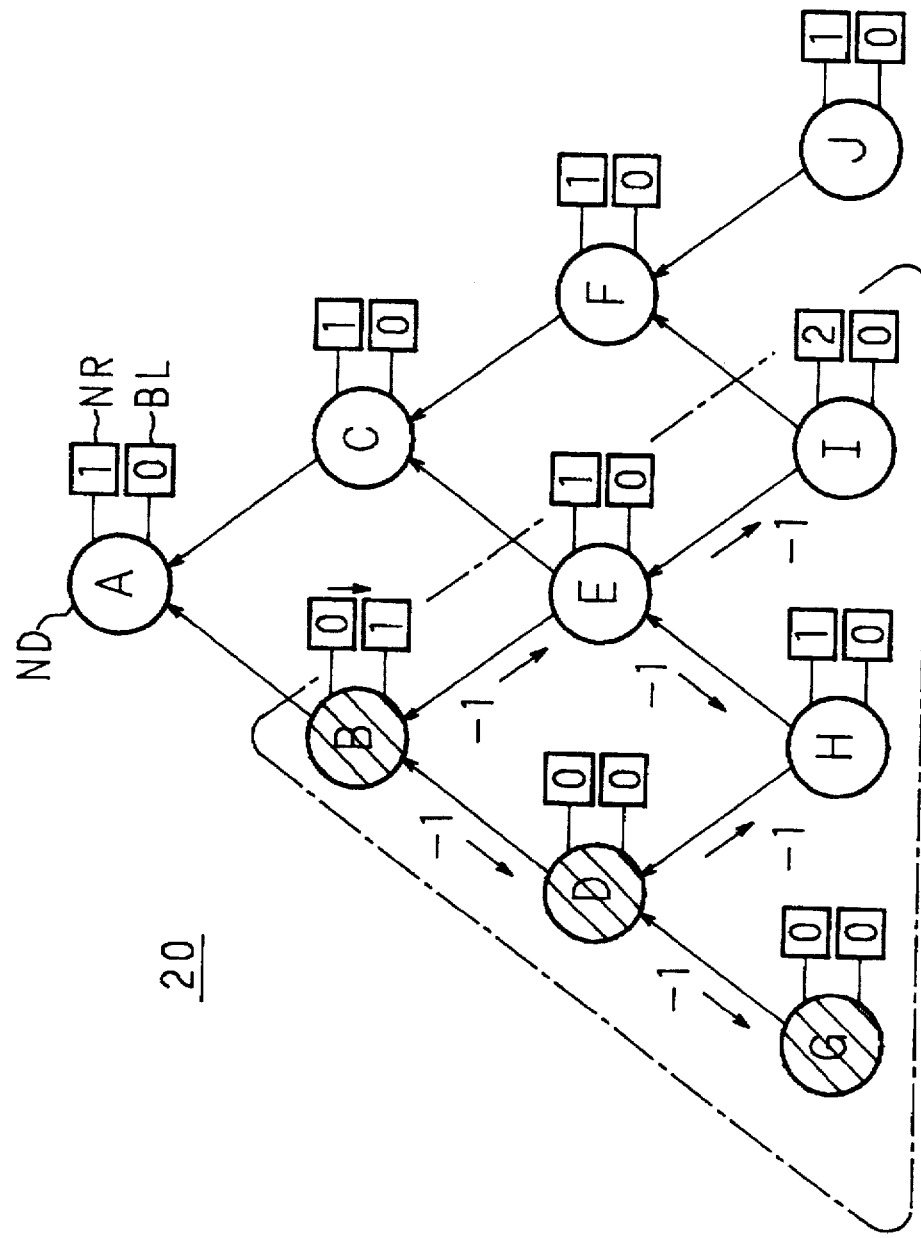
FIG. 14A is a view showing a non-activated state of a node B of FIG. 11.

FIG. 14A shows the state where the non-activation instruction is given to the node B from the node A, which is as same as the above-mentioned FIG. 13A. When the non-activation instruction is given to the node E from the node C in the state shown in FIG. 14A, as shown in FIG. 14B, the nodes E, H become non-active.

Figure 14B:
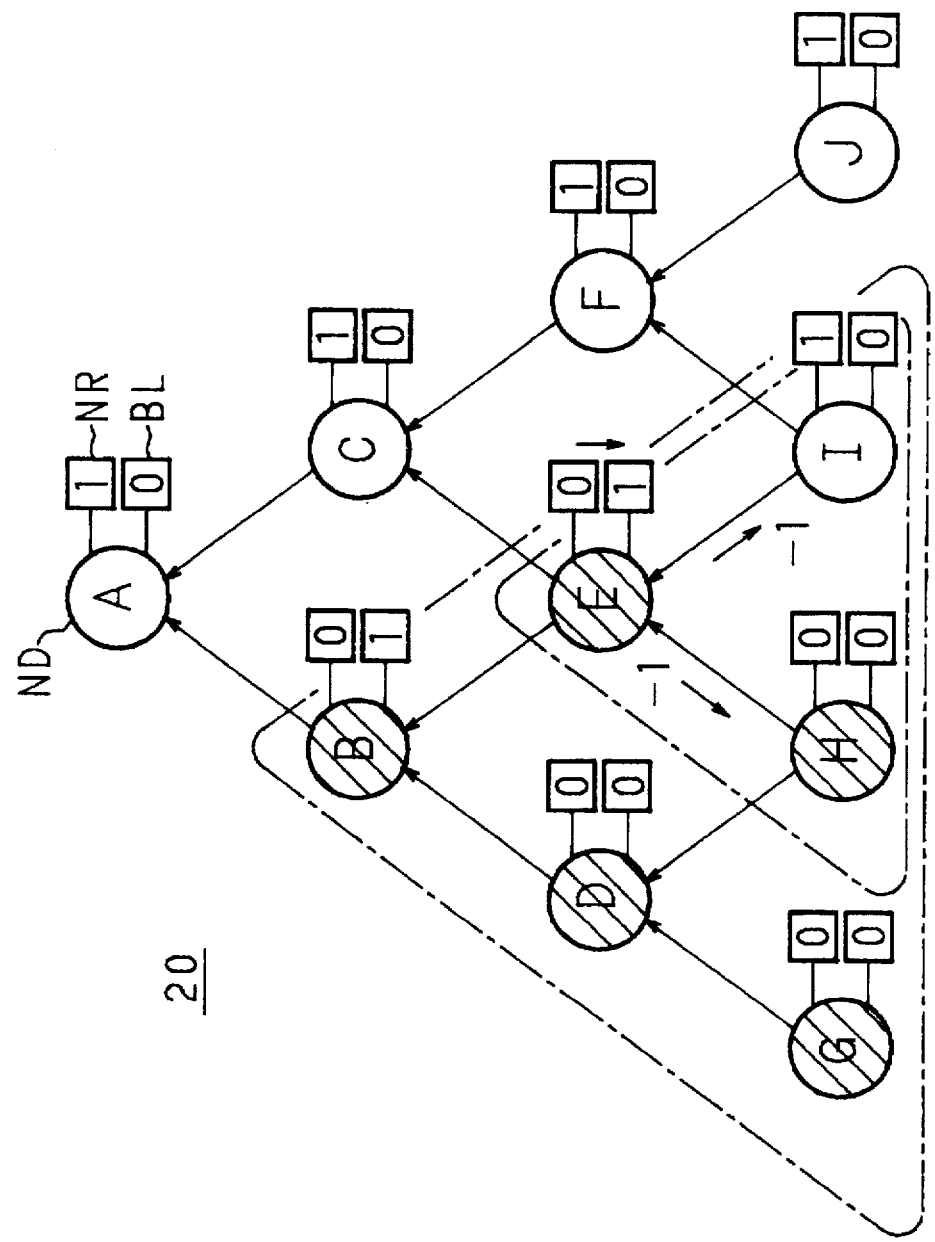
FIG. 14B is a view showing a non-activated state of a node E of FIG. 14A.
Figure 14C:
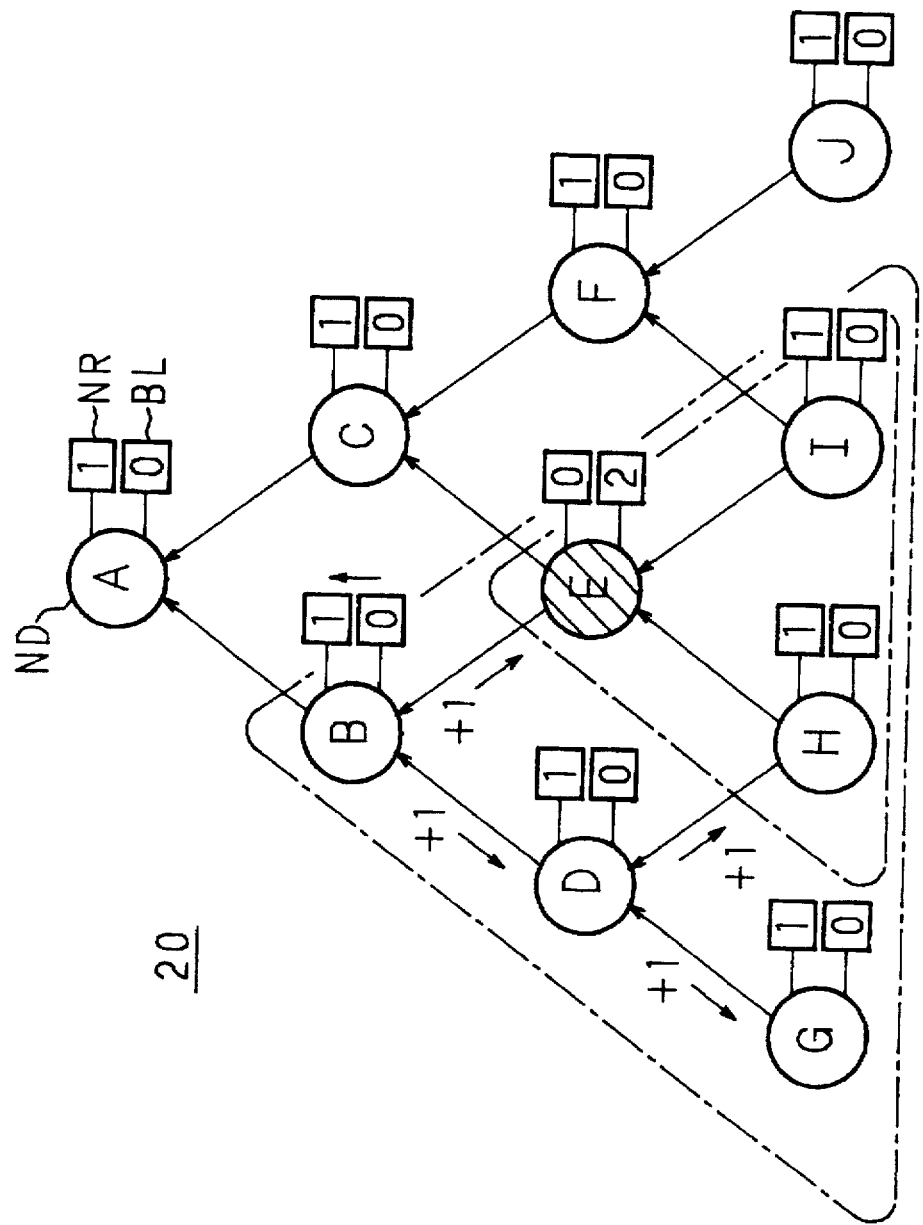
FIG. 14C is a view showing an activated state of a node B of FIG. 14B.

When the activation instruction is given to the node B in the state shown in FIG. 14B, as shown in FIG. 14C, the value "1" of the status variable VS is stored in the normal memory NR, and the value "1" is transferred to the nodes D, E. As a result, though it is added to the normal memory NR in the node D and the value is transferred further to the lower layer nodes G, H, since the node E is in the blocking state, the value "1" is added to the blocking memory BL, but it is not transferred to the lower layer nodes H, I. As a result, the content of the normal memory NR of the node E becomes "0" and the content of the blocking memory BL becomes "2".

Figure 14D:
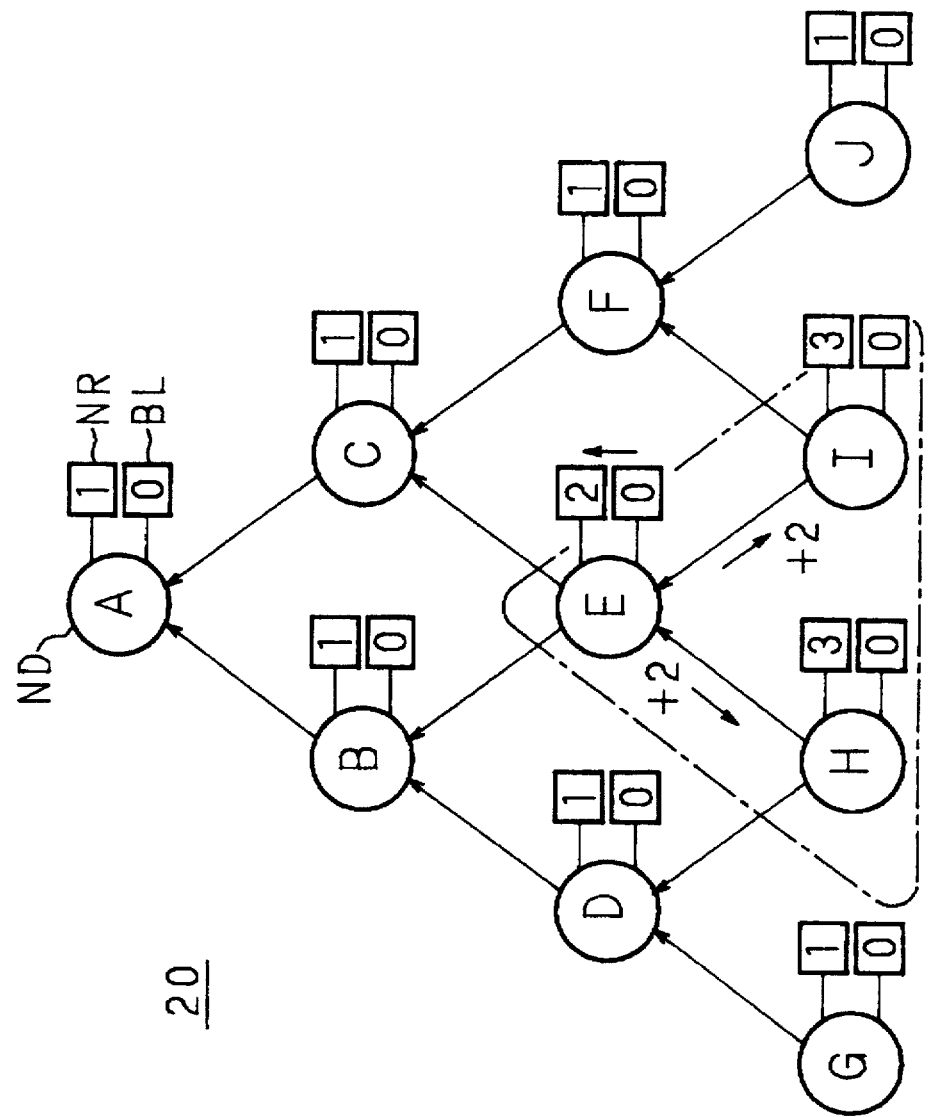
FIG. 14D is a view showing an activated state of a node E of FIG. 14C.

When the activation instruction is given to the node E in the state shown in FIG. 14C, as shown in FIG. 14D, the contents of the normal memory NR and the blocking memory BL are replaced with one another in the node E, and the value "2" of the status variable VS of the node E is transferred to the lower layer nodes H, I. Thereby, all nodes are activated and a return is made to the state shown in FIG. 11.

FIGS. 15A, 15B, 15C and 15D are views showing the state, where the node E is non-activated, the node B is non-activated, the node E is activated and node B is activated sequentially from the state shown in FIG. 11.

Figure 15A:
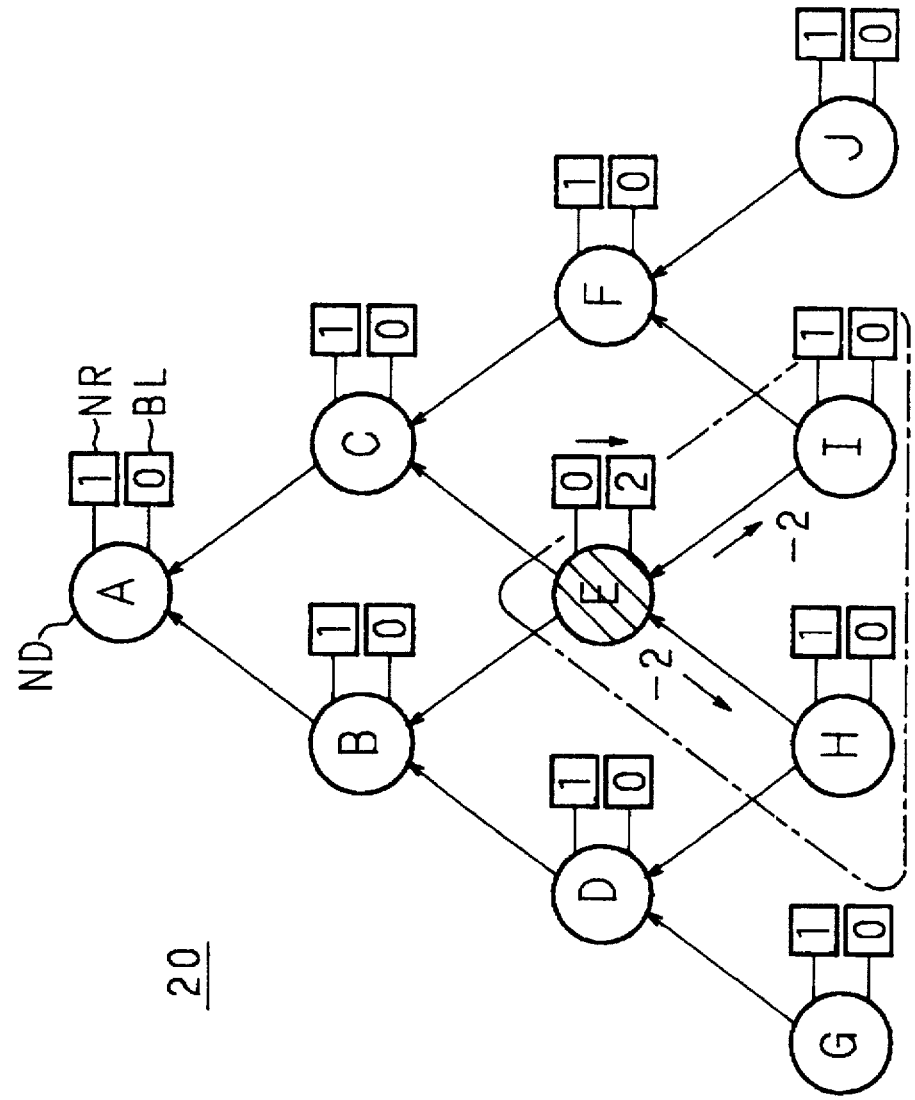
FIG. 15A is a view showing a non-activated state of a node E of FIG. 11.
Figure 15B:
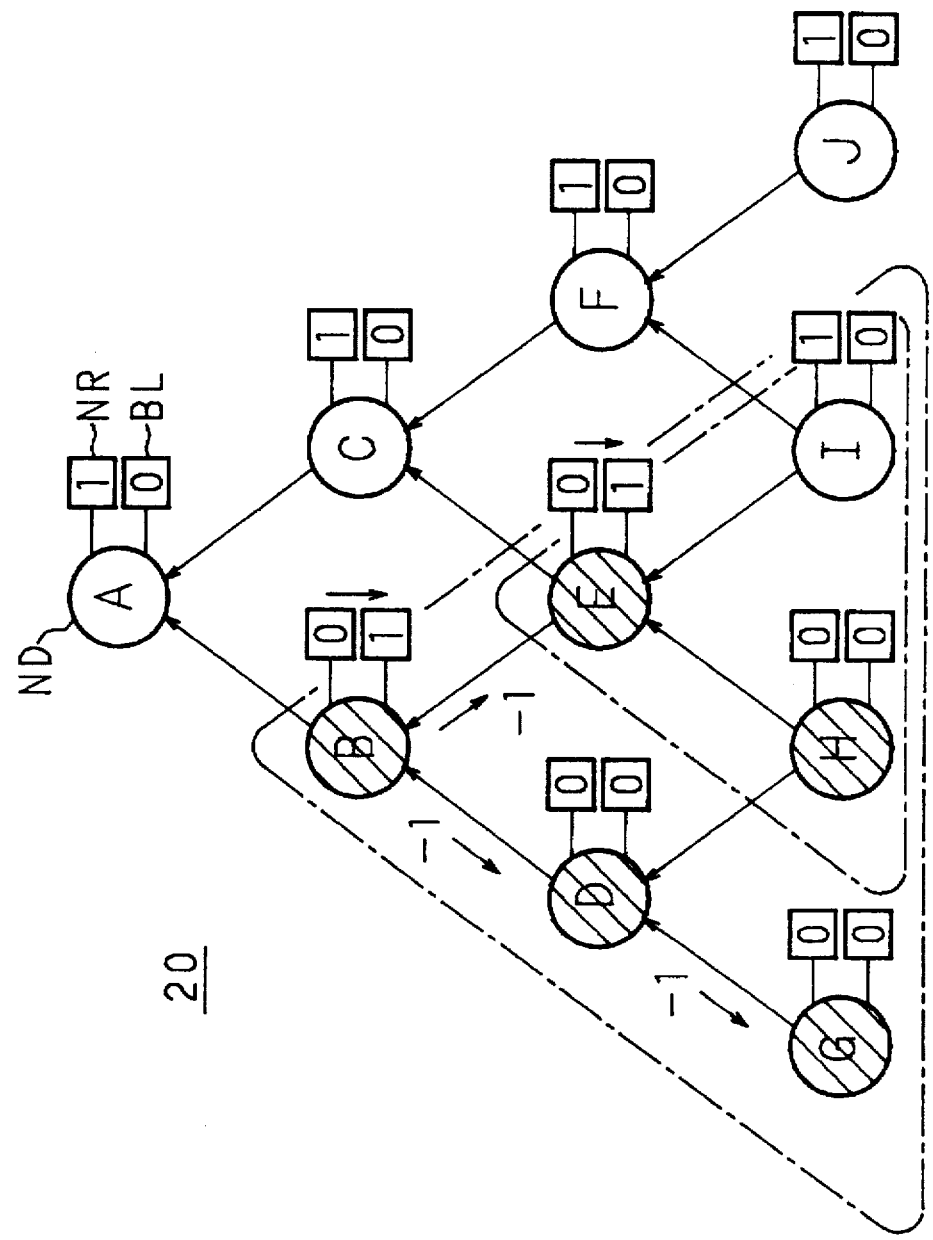
FIG. 15B is a view showing a non-activated state of a node B of FIG. 15A.

FIG. 15A shows the state where the non-activation instruction is given to the node E, and thereby the node E is in the non-active state as well as in the blocking state. When the non-activation instruction is given to the node B in the state shown in FIG. 15A, as shown in FIG. 15B, the contents of the normal memory NR and the blocking memory BL of the node B are replaced with one another, and the value "−1" is transferred to the nodes D, E. As a result, it is added to the normal memory NR in the node D and the value is further transferred to the lower layer nodes G, H, but since the node E is in the blocking state, the value "−1" is added to the blocking memory BL, but is not transferred to the lower layer nodes H, I. As a result, the nodes B, D, E, G, H are in the non-active state and the nodes B, E are in the blocking state.

Figure 15C:
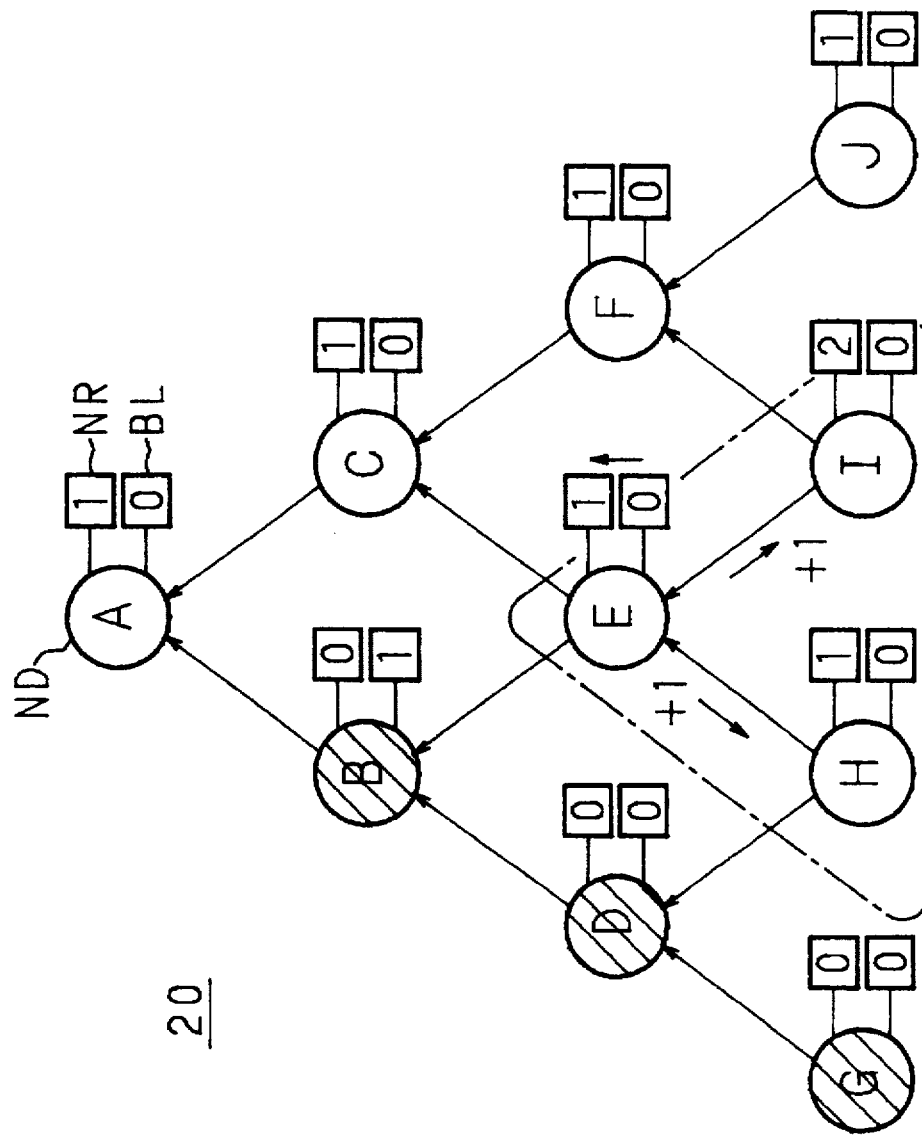
FIG. 15C is a view showing an activated state of a node E of FIG. 15B.
Figure 15D:
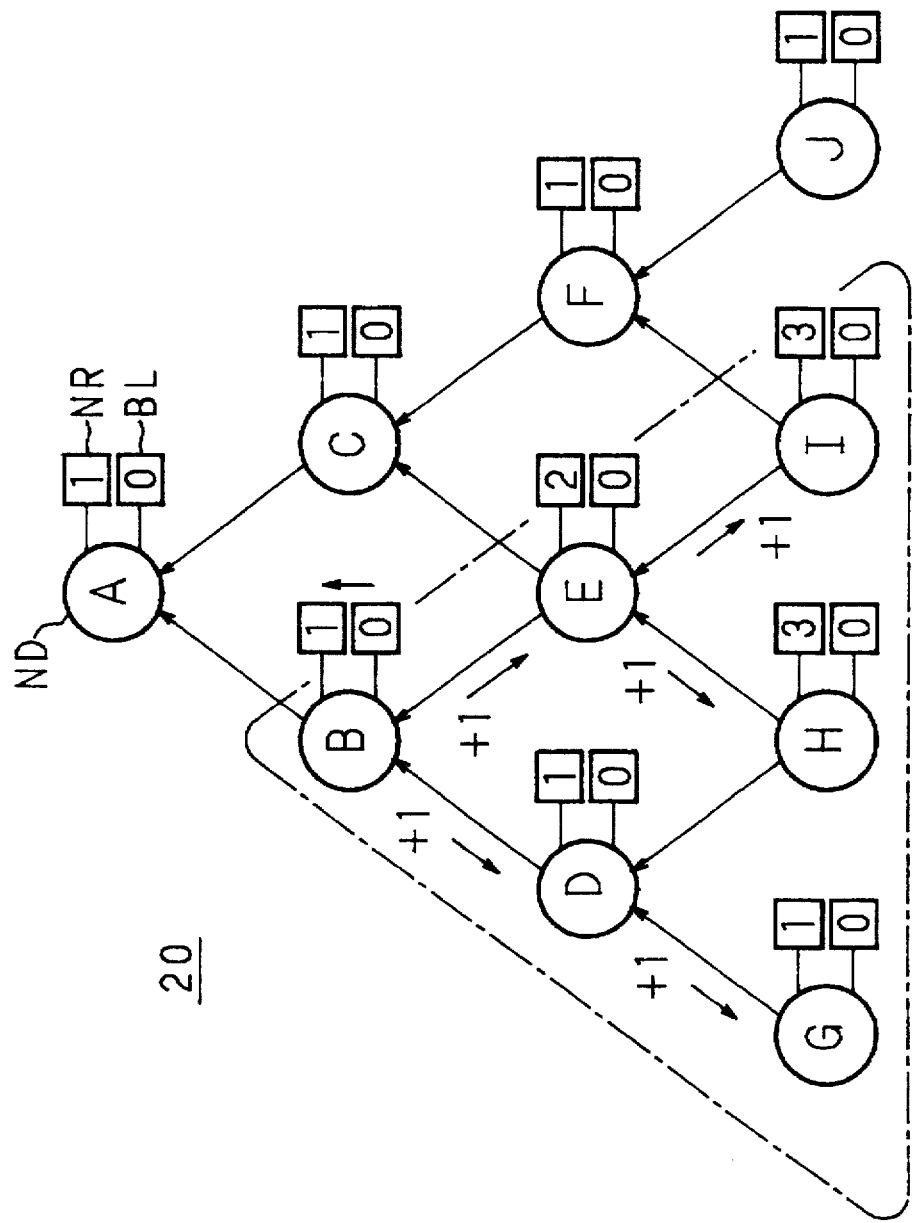
FIG. 15D is a view showing an activated state of a node B of FIG. 15C.

When the activation instruction is given to the node E in the state shown in FIG. 15B, as shown in FIG. 15C, the nodes E, H, I become active, and further, when the activation instruction is given to the node B, as shown in FIG. 15D, all of the nodes become active.

Figure 1:
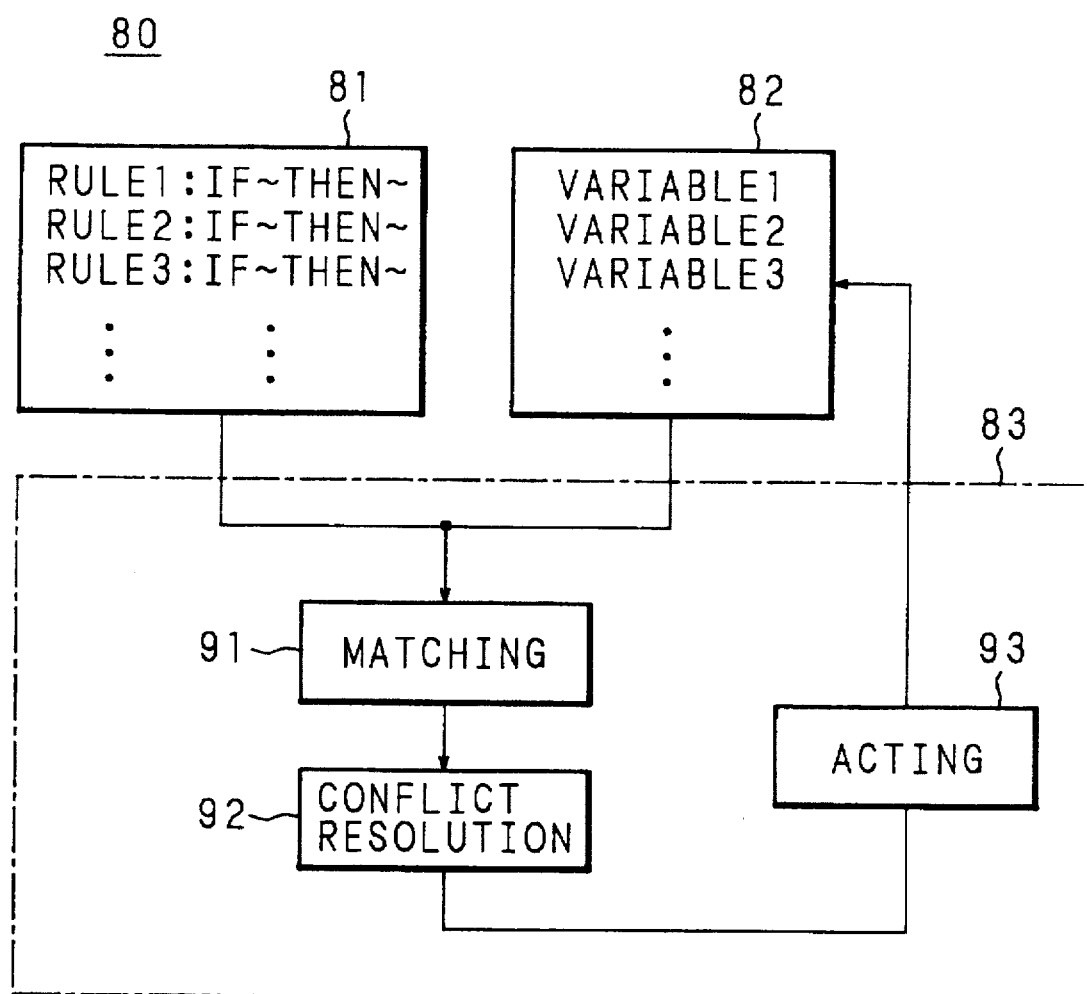
FIG. 1 is a block diagram showing a configuration of a conventional production system.
Figure 2:
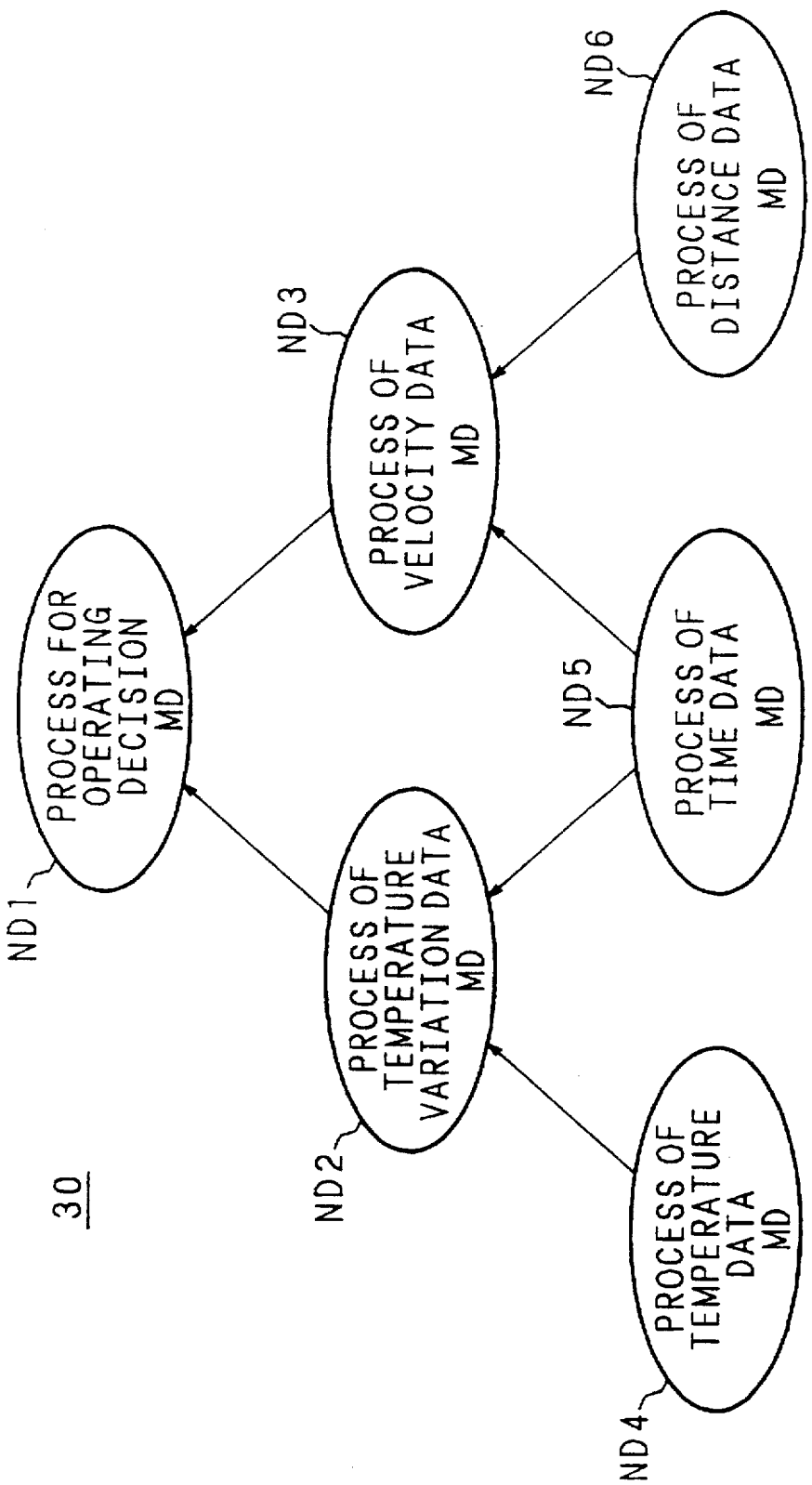
FIG. 2 is a view showing a configuration of a node of a conventional hierarchical network.
Figure 16A:
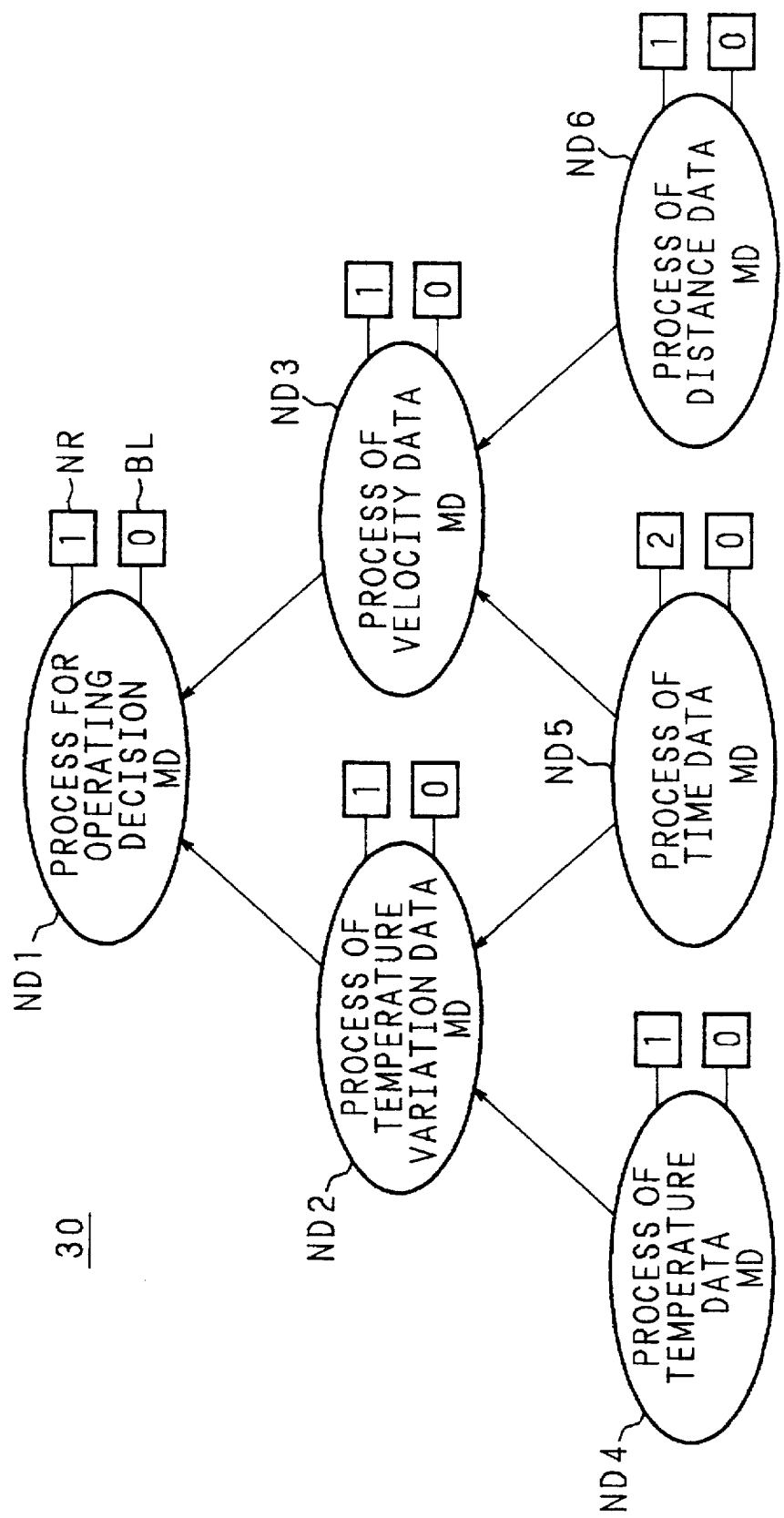
FIG. 16A is a view showing a specific example of a network for carrying out a method of the present invention.
Figure 16B:
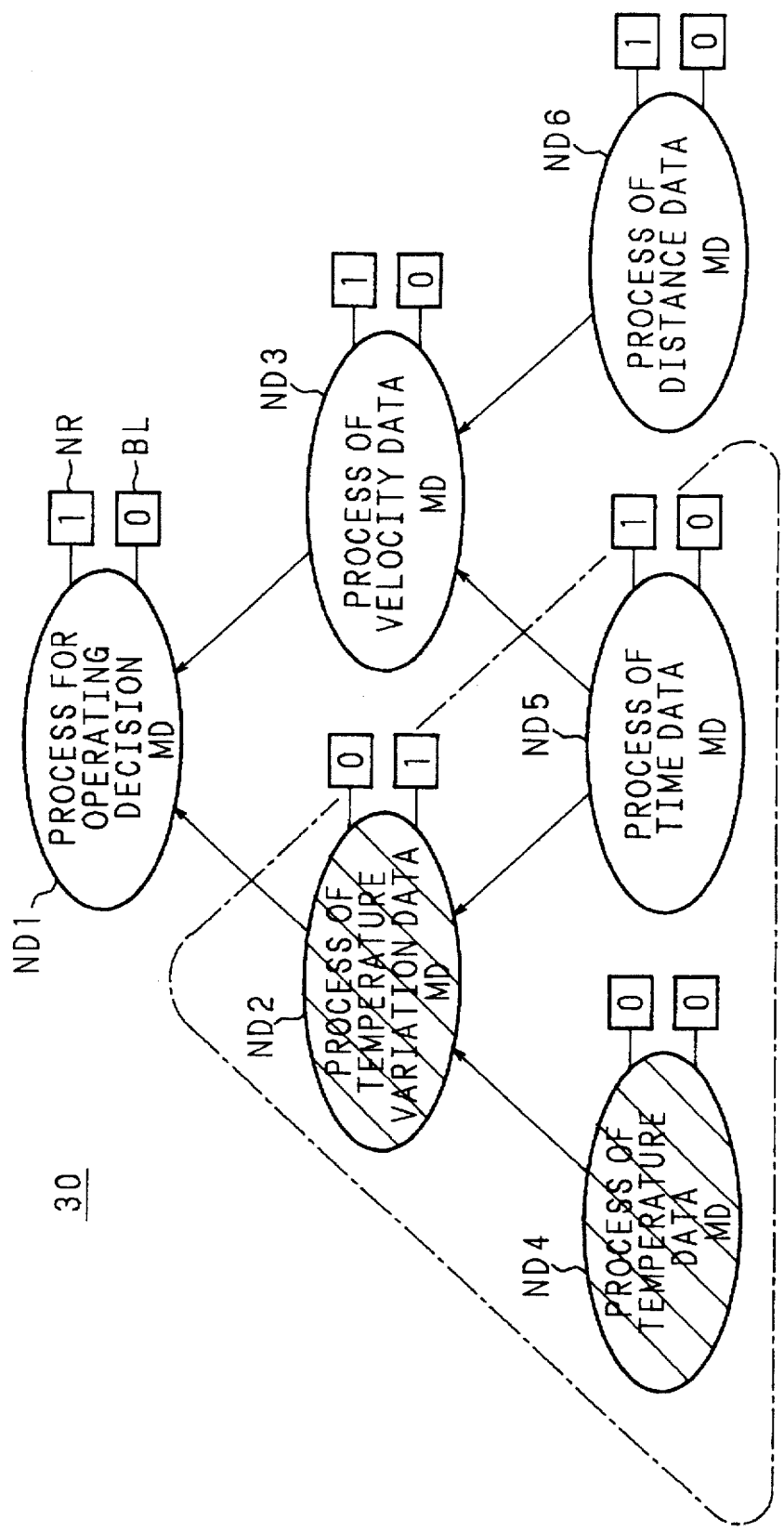
FIG. 16B is a view showing a specific example of a network for carrying out a method of the present invention.

FIGS. 16A and 16B are views showing a specific example of a network in the case of using a control method of the present invention. Nodes ND1 to ND6 are modules included in a hierarchical network 30, and as the same as the aforementioned hierarchical network, the normal memory NR and the blocking memory BL are provided in the respective nodes ND. Other configurations are similar to the network shown in FIG. 2.

In the network 30, when information related to temperature variations from the node ND2 is not necessary in processing the node ND1, the non-activation instruction is given to the node ND2 from the node ND1.

As a result, as shown in FIG. 16B, the node ND2 and the node ND4 become non-active. Thus, the processing of the node ND which is not necessary for the processing of the node ND1 is stopped, a processing efficiency in the network 30 is improved and the processing speed is increased as a whole.

Figure 17:
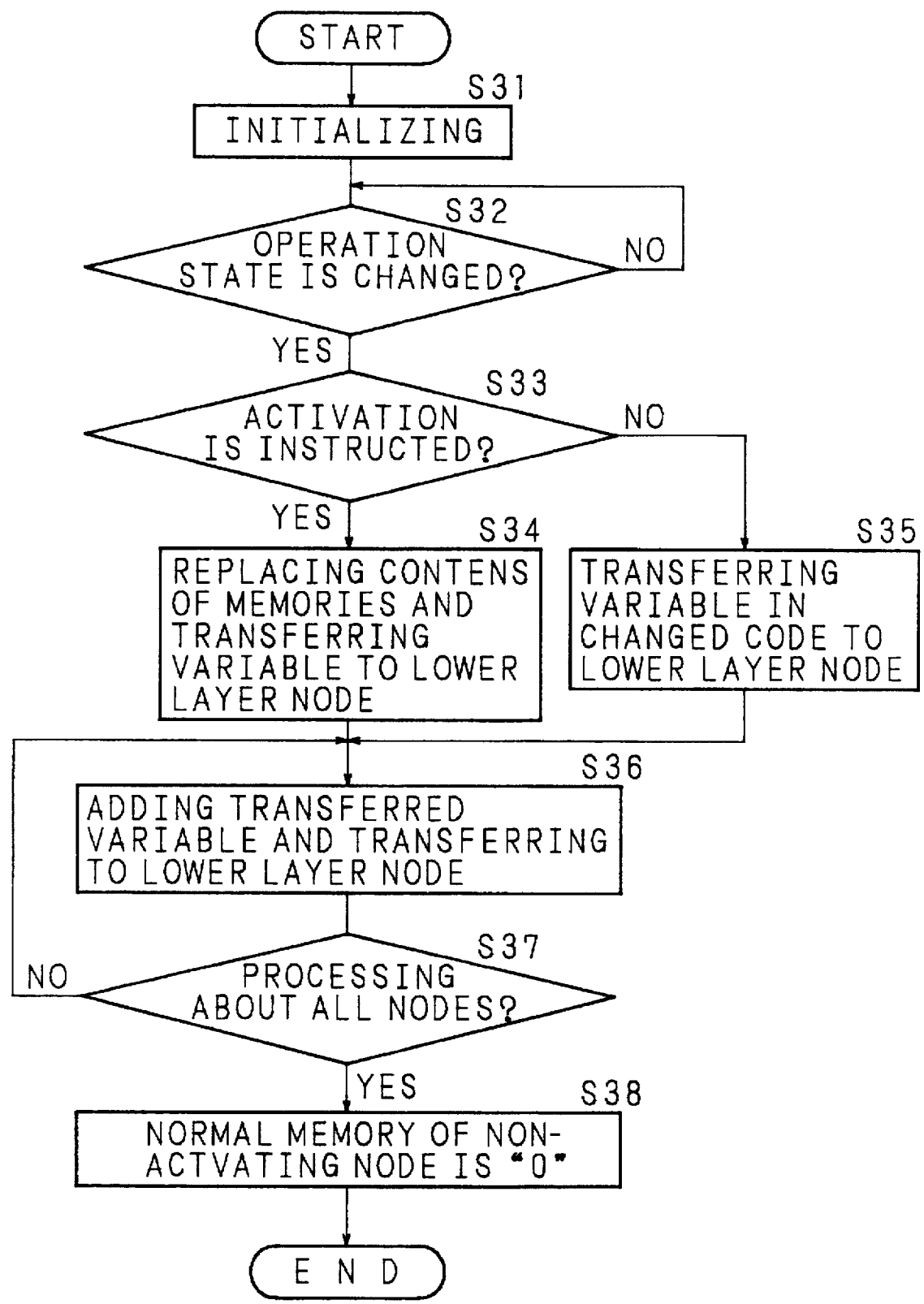
FIG. 17 is a flow chart showing an outline of a method of the present invention.

FIG. 17 is a flow chart showing an outline of a method of node control according to the present invention.

The normal memory NR and blocking memory BL of the nodes ND are initialized (Step S31) to judge whether there is the change in the operation state or not (Step S32). When there is the change in the operation state and the activation is instructed (Step S33), the contents of the memories NR, BL of the instructed node ND are replaced by one another, and the value of the status variable VS is transferred to the lower layer node ND (Step S34). When the non-activation is instructed in the Step S33, the value of the status variable VS is transferred in changed code (Step S35).

In the node ND receiving the transfer, the value is added to the status variable VS and transferred to the lower layer node ND (Step S36). After processing all the nodes ND except those in the blocking state (Step S37), the node ND whose normal memory NR is "0" is non-activated (Step S38).

According to the above-mentioned embodiment, in the hierarchical network, by designating the direct node ND which is not necessary for the processing, all unnecessary nodes ND can be decided at high-speed with only a small amount of resources expended, and thus the processings in the networks 1, 3 can be performed efficiently.

Also, when there is the transfer in the node ND which is in the blocking state, the transfer to the lower layer nodes ND from that node ND is stopped, so that even in the network including the blocking state, the status of the nodes ND is reflected properly to the status variable VS and the operating state of the nodes ND can be controlled accurately.

Since the normal memory NR and the blocking memory BL in a plurality of nodes are provided in the node management table TNM, an optimum control can be effected in accordance with the purpose of use of the network I and situations being controlled.

In the above-mentioned embodiment, though the case where the activation or non-activation instruction and the transfer of values are made from the upper layer to the lower layer is described, it is also possible to apply to the case where the instruction and transfer are made from the lower layer to the upper layer. For example, it is possible to apply to the case, where it is meaningless to process the upper layer when the lower layer processing is stopped due to some troubles or the like.

In the above-mentioned embodiment, though an initial value of the normal memory NR of the upper most layer node is set to "1", another value may be set. Also, though it is made active when the value of the status variable VS is not "0", a threshold for deciding whether to make active or to make non-active may be the other value in accordance with the initial value or the like. Though the transferred value is added in the nodes ND, it may be subtracted. Besides, the node management table TNM or the configuration, structure, processing contents or sequences, operation timing and so on of the networks 1, 3 may changed diversely without departing from the meanings of the present invention.

According to the present invention, in the hierarchical network, by designating the direct node which is not necessary for processing, all unnecessary nodes can be decided at high-speed and the processings in the network can be effected efficiently.

Furthermore, the state of the nodes is reflected properly to the status variable even in the network including the blocking state, and the operating state of the nodes can be controlled accurately.

Still further, an optimum control can be effected in accordance with the purpose of use of the networks and situations being controlled.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A production system, comprising:

a data base having a plurality of modules in a network structure, wherein each of said modules includes a data part storing data which change in time series and a program part which controls said data part;

a rule base having a plurality of production rules respectively including a condition part and an executing part which executes the production rule in accordance with the truth of the condition provided in said condition part; and an inference control unit for inference control using said production rules and data included in said data base, wherein said inference control unit includes a network processing unit which enables one module, which refers to a data part of another module, to execute the program part of the one module only when the data part of the another module has changed, and a production processing unit for executing the production rule, using the data of the data part of the module whose data part has changed.

2. A production system according to claim 1, wherein said network processing unit includes:

a module selecting unit which selects the modules sequentially from said data base;

a reference data judging unit which judges whether the data part of the module to which the selected module refers to has changed; and a program executing unit which executes the program part of the selected module which refers to the data part, only when said reference data judging unit judges the change.

3. A production system according to claim 1, wherein said production processing unit includes:

a rule selecting unit which selects ones of the production rules which refer to the modules whose data parts have changed;

a matching unit which matches respective condition parts included in the selected production rules with the data parts included in the modules of said data base, and takes out the production rules satisfying said condition parts as conflict rules;

a conflict resolution unit which selects a production rule from said conflict rules; and a rule executing unit which executes the selected production rule.

4. A production system according to claim 2, wherein said production processing unit includes:

a rule selecting unit which selects ones of the production rules which refer to the modules whose data parts have changed;

a matching unit which matches respective condition parts included in the selected production rules with the data parts included in the modules of said data base, and takes out the production rules satisfying said condition parts as conflict rules;

a conflict resolution unit which selects a production rule from said conflict rules; and a rule executing unit which executes the selected production rule.

5. A production system according to claim 1, wherein said network processing unit and said production processing unit perform independent processes, and said network processing unit operates at a constant cycle, and said production processing unit operates while said network processing unit is not operating.

6. A production system according to claim 2, wherein said network processing unit and said production processing unit perform independent processes, and said network processing unit operates at a constant cycle, and said production processing unit operates while said network processing unit is not operating.

7. A production system according to claim 3, wherein said network processing unit and said production processing unit perform independent processes, and said network processing unit operates at a constant cycle, and said production processing unit operates while said network processing unit is not operating.

8. A production system according to claim 1, wherein said data base includes a module having a program part which refers to an output of a sensor detecting conditions of an external environment.

9. A production system according to claim 2, wherein said data base includes a module having a program part which refers to an output of a sensor detecting conditions of an external environment.

10. A production system according to claim 3, wherein said data base includes a module having a program part which refers to an output of a sensor detecting conditions of an external environment.

11. A hierarchical network, comprising:

a plurality of nodes, each having a data part;

first memories for storing status variable values of said nodes, respectively;

second memories for taking said status variable values from said first memories, respectively; and a node management unit for managing said nodes, which switches the status variable value stored in the first memory corresponding to the node instructed to change its operating state, with the status variable value stored in the second memory corresponding to the node being instructed to change, transfers a value based on the change in the status variable stored in the first memory corresponding to the node being instructed to change to another node which is interdependent with the node being instructed to change, enables the another node receiving the transfer to add the transferred value to the status variable value of the another node receiving the transfer, and to transfer said transferred value to the node which is interdependent with itself, judges whether the status variable values of the respective nodes included in said hierarchical network exceed a reference value, and decides the operating state of the respective nodes in accordance with the judged results.

12. A hierarchical network, comprising:

a plurality of nodes, each having a data part, first memories variable values of the nodes, respectively;

second memories for taking said status variable values from said first memories, respectively; and a node management unit for managing said nodes, which switches the status variable value stored in the first memory corresponding to the node instructed to change its operating state, and the status variable value stored in the second memory corresponding to the node being instructed to change, transfers a changed status variable value stored in the first memory corresponding to the node being instructed to change to another node which is interdependent with the node being instructed to change, when the instruction is for activating the operating state, and transfers an inverted code of the changed status variable value stored in the first memory corresponding to the node being instructed to change, when the instruction is for non-activating the operating state, enables the node receiving the transfer to add the transferred value to the status variable value of the another node receiving the transfer, and to transfer said transferred value to the node which is interdependent with itself, judges whether the status variable values of the respective nodes included in said hierarchical network exceed a reference value, and decides the operating state of the respective nodes in accordance with the judged results.

13. A method of controlling the operating state of nodes of a hierarchical network provided with first memories for storing status variables of a plurality of nodes having data parts, and second memories for saving said status variables, by a node management unit for managing said nodes, comprising the steps of:

switching a status variable value stored in the first memory corresponding to the node instructed to change its operating state, with a status variable value stored in the second memory corresponding to the node being instructed to change;

transferring a value based on the change in status variable stored in the first memory corresponding to the node being instructed to change to another node which is interdependent with the node being instructed to change;

allowing the another node receiving the transfer to add the transferred value to the status variable value included the node receiving the transfer, and to transfer said transferred value to the node which is interdependent with itself;

judging whether the status variable value of the respective nodes included in said hierarchical network exceed a reference value; and determining the operating state of the respective nodes in accordance with the judged results.

14. A method of controlling an operating state of nodes of a hierarchical network provided with first memories for storing status variables of a plurality of nodes having data parts, and second memories for saving said status variables, by a node management unit for managing said nodes, comprising the steps of:

switching a status variable value stored in the first memory corresponding to the node instructed to change its operating state with a status variable value stored in the second memory corresponding to the node being instructed to change;

transferring a changed status variable value stored in the first memory corresponding to the node being instructed to change to another node which is interdependent with the node being instructed to change, when the instruction is for activating the operating state, while transferring an inverted code of the changed status variable value stored in the first memory corresponding to the node being instructed to change, to the another node which is interdependent with the node being instructed to change, when the instruction is for non-activating the operating state;

allowing the another node receiving the transfer to add the transferred value to the status variable value included the node receiving the transfer, and to transfer said transferred value to the node which is interdependent with itself;

judging whether the status variable values of the respective nodes included in said hierarchical network exceed a reference value; and determining the operating state of the respective nodes in accordance with the judged results.

15. A method of node control of a hierarchical network according to claim 14, wherein when a destination node has received a non-activation instruction, said destination node stops the transfer of status variable values to the other nodes.

16. A method of node control of a hierarchical network according to claim 13, wherein plural sets of said first memories and said second memories are respectively provided in said nodes, and the operating state of said nodes for a plurality of operating purposes is determined by switching these sets.

17. A method of node control of a hierarchical network in accordance with claim 14, wherein plural sets of said first memories and said second memories are respectively provided in said nodes, and the operating state of said nodes for a plurality of operating purposes is determined by switching these sets.

18. A method of node control of a hierarchical network in accordance with claim 15, wherein plural sets of said first memories and said second memories are respectively provided in said nodes, and the operating state of said nodes for a plurality of operating purposes is determined by switching these sets.

19. A production system which receives information in a time series, comprising:

a data base having a plurality of modules in a hierarchical network structure, wherein each of said modules includes a data part storing data and a program part which controls the data stored in the data part, said program part receives the information if the node is at the lower level of the hierarchical network structure and is linked to the data part of a node of the lower level if the node is other than at the lower level;

a rule base having a plurality of production rules, each including a condition part and an executing part which executes the production rule in accordance with the truth of the condition part; and an inference control unit which judges whether a data part of a selected module to which the program part of the selected module refers to has changed, and selects only the production rule which refers to the selected module whose data part has changed.

* * * * *